US012775070B2

(12) United States Patent
Huang et al.

(10) Patent No.: US 12,775,070 B2
(45) Date of Patent: Oct. 27, 2026

(54) LIDAR LIGHT SOURCE AND SYSTEM

(71) Applicant: SHENZHEN GUANGJIAN TECHNOLOGY CO., LTD., Shenzhen (CN)

(72) Inventors: Ruibin Huang, Shenzhen (CN); Shizhi Lyu, Shenzhen (CN); Li Zhu, Shenzhen (CN); Fanglu Lyu, Shenzhen (CN); Bo Wang, Shenzhen (CN)

(73) Assignee: Shenzhen Guangjian Technology Co., Ltd., Shenzhen (CN)

( * ) Notice: Subject to any disclaimer, the term of this patent is extended or adjusted under 35 U.S.C. 154(b) by 468 days.

(21) Appl. No.: 18/241,808

(22) Filed: Sep. 1, 2023

(65) Prior Publication Data

US 2024/0142578 A1 May 2, 2024

(30) Foreign Application Priority Data

| | | | |
|---|---|---|---|
| Nov. 2, 2022 | (CN) | ........................ | 202211362329.3 |
| Nov. 2, 2022 | (CN) | ........................ | 202211363009.X |
| Nov. 2, 2022 | (CN) | ........................ | 202211363010.2 |
| Nov. 2, 2022 | (CN) | ........................ | 202211363022.5 |

(51) Int. Cl.

| | |
|---|---|
| ***G01S 7/48*** | (2006.01) |
| ***G01S 7/481*** | (2006.01) |
| ***G01S 7/484*** | (2006.01) |

(52) U.S. Cl.

CPC ............ *G01S 7/4815* (2013.01); *G01S 7/484* (2013.01)

(58) Field of Classification Search

None

See application file for complete search history.

(56) References Cited

U.S. PATENT DOCUMENTS

| | | | |
|---|---|---|---|
| 5,249,049 | A | 9/1993 | Kranawetter et al. |
| 6,892,052 | B2 | 5/2005 | Kotola et al. |
| 7,245,937 | B2 | 7/2007 | Maari |
| 7,269,388 | B2 | 9/2007 | Poursabahian et al. |

(Continued)

FOREIGN PATENT DOCUMENTS

| | | | |
|---|---|---|---|
| CN | 107039885 | A | 8/2017 |
| CN | 207134607 | U | 3/2018 |

(Continued)

OTHER PUBLICATIONS

Office Action dated Nov. 29, 2011, issued in related Japanese Application No. 2007-206709, with English machine translation (4 pages).

(Continued)

*Primary Examiner* — Hovhannes Baghdasaryan

(74) *Attorney, Agent, or Firm* — Sheppard Mullin Richter & Hampton LLP

(57) ABSTRACT

A lidar light source includes an array of edge-emitting lasers (EELs) and a cylindrical lens. Each of the EELs includes an active region. Light emitting ports of the plurality of active regions are disposed adjacent to each other. The plurality of active regions share a cathode and include separate anodes, or share an anode and include separate cathodes. The cylindrical lens is configured to collimate light beams emitted from the array of EELs in a fast axis direction, and fuse the light beams emitted through the light emitting ports into a uniform light beam on a target surface.

20 Claims, 14 Drawing Sheets

(56) References Cited

U.S. PATENT DOCUMENTS

| | | | | |
|---|---|---|---|---|
| 7,336,926 | B2 | 2/2008 | Noda et al. | |
| 7,336,928 | B2 | 2/2008 | Paalasmaa et al. | |
| 7,403,793 | B2 | 7/2008 | Mauney et al. | |
| 7,415,279 | B2 | 8/2008 | Liang | |
| 7,433,677 | B2 | 10/2008 | Kantola et al. | |
| 7,471,200 | B2 | 12/2008 | Otranen | |
| 7,478,069 | B1 | 1/2009 | Ritter et al. | |
| 7,545,795 | B2 | 6/2009 | Hinsey | |
| 7,565,108 | B2 | 7/2009 | Kotola et al. | |
| 7,643,798 | B2 | 1/2010 | Ljung | |
| 7,657,255 | B2 | 2/2010 | Abel et al. | |
| 7,675,537 | B2 | 3/2010 | Wilson et al. | |
| 7,693,542 | B2 | 4/2010 | Mauney et al. | |
| 7,801,486 | B2 | 9/2010 | Barnier | |
| 7,844,362 | B2 | 11/2010 | Handfield et al. | |
| 7,865,571 | B2 | 1/2011 | Ho et al. | |
| 7,882,531 | B2 | 2/2011 | Yamagishi | |
| 7,937,451 | B2 | 5/2011 | Ho et al. | |
| 7,941,169 | B2 | 5/2011 | Son et al. | |
| 7,945,211 | B2 | 5/2011 | Duerdodt et al. | |
| 7,970,350 | B2 | 6/2011 | Sheynman et al. | |
| 8,175,529 | B2 | 5/2012 | Wakasa et al. | |
| 8,588,691 | B2 | 11/2013 | Wakasa et al. | |
| 2003/0158785 | A1 | 8/2003 | Erca | |
| 2006/0206582 | A1 | 9/2006 | Finn | |
| 2006/0258289 | A1 | 11/2006 | Dua | |
| 2007/0083553 | A1 | 4/2007 | Minor | |
| 2007/0097127 | A1 | 5/2007 | Seo et al. | |
| 2007/0189321 | A1 | 8/2007 | Lee et al. | |
| 2007/0239981 | A1 | 10/2007 | Lessing | |
| 2008/0002654 | A1 | 1/2008 | Bolin | |
| 2008/0095080 | A1 | 4/2008 | Danzeisen et al. | |
| 2008/0104219 | A1 | 5/2008 | Kageyama et al. | |
| 2008/0108391 | A1 | 5/2008 | Vau et al. | |
| 2008/0137862 | A1 | 6/2008 | Morita et al. | |
| 2008/0139125 | A1 | 6/2008 | Son et al. | |
| 2008/0165906 | A1 | 7/2008 | Ho et al. | |
| 2008/0186196 | A1 | 8/2008 | Lessing | |
| 2008/0195546 | A1 | 8/2008 | Lilley | |
| 2008/0198847 | A1 | 8/2008 | Yamagishi et al. | |
| 2008/0220878 | A1 | 9/2008 | Michaelis | |
| 2008/0248740 | A1 | 10/2008 | Lazovsky et al. | |
| 2009/0006626 | A1 | 1/2009 | Yamagishi | |
| 2009/0011753 | A1 | 1/2009 | Barnier | |
| 2009/0013087 | A1 | 1/2009 | Lorch et al. | |
| 2009/0037385 | A1 | 2/2009 | Min et al. | |
| 2009/0043783 | A1 | 2/2009 | Wakasa et al. | |
| 2009/0111378 | A1 | 4/2009 | Sheynman et al. | |
| 2010/0198944 | A1 | 8/2010 | Ho et al. | |
| 2011/0070825 | A1 | 3/2011 | Griffin et al. | |
| 2011/0070826 | A1 | 3/2011 | Griffin et al. | |
| 2011/0070827 | A1 | 3/2011 | Griffin et al. | |
| 2011/0070828 | A1 | 3/2011 | Griffin et al. | |
| 2011/0070829 | A1 | 3/2011 | Griffin et al. | |
| 2011/0093569 | A1 | 4/2011 | Yamagishi | |
| 2011/0317878 | A1 | 12/2011 | Kang et al. | |
| 2012/0038903 | A1* | 2/2012 | Weimer | G01C 3/08 250/208.2 |
| 2015/0109576 | A1 | 4/2015 | Krasnow et al. | |
| 2018/0167602 | A1* | 6/2018 | Pacala | G02B 5/208 |
| 2018/0259645 | A1* | 9/2018 | Shu | G01S 7/4816 |
| 2018/0301874 | A1* | 10/2018 | Burroughs | G01J 1/44 |

FOREIGN PATENT DOCUMENTS

| | | | | |
|---|---|---|---|---|
| CN | 109863445 | A | 6/2019 | |
| CN | 110221309 | A | 9/2019 | |
| CN | 110824490 | A | 2/2020 | |
| CN | 211149094 | U | 7/2020 | |
| CN | 112544020 | A | 3/2021 | |
| CN | 113189826 | A | 7/2021 | |
| CN | 114549609 | A | 5/2022 | |
| CN | 218867636 | U | 4/2023 | |
| CN | 220455519 | U | 2/2024 | |
| EP | 1530115 | A2 | 5/2005 | |
| EP | 1722526 | B1 | 11/2006 | |
| JP | 2001-128242 | A | 5/2001 | |
| JP | 2001-215975 | A | 8/2001 | |
| JP | 2004-054023 | A | 2/2004 | |
| JP | 2005-167946 | A | 6/2005 | |
| JP | 2005-182762 | A | 7/2005 | |
| JP | 2006-285716 | A | 10/2006 | |
| JP | 2006-331155 | A | 12/2006 | |
| JP | 2007-058688 | A | 3/2007 | |
| JP | 2007-150984 | A | 6/2007 | |
| WO | 2005/034373 | A2 | 4/2005 | |
| WO | 2007/023120 | A1 | 3/2007 | |
| WO | WO-2022209369 | A1 * | 10/2022 | G01S 7/4815 |

OTHER PUBLICATIONS

Office Action dated Sep. 19, 2013, issued in related Japanese Application No. 2012-050404, with English machine translation (4 pages).

Office Action dated Mar. 11, 2014, issued in related Japanese Application No. 2012-050404, with English machine translation (6 pages).

Gerd Kortuem et al., "When Peer-to-Peer comes Face-to-Face: Collaborative Peer-to-Peer Computing in Mobile Ad hoc Networks", Peer-to-Peer Computing, 2001. Proceedings First International Conference on Linkoping, XP010583978, Aug. 27, 2001, pp. 75-91.

First Office Action and Search Report dated Jul. 29, 2026, issued in Chinese Patent Application No. 202310156098.9, with English machine translation (18 pages).

First Office Action and Search Report dated Aug. 1, 2026, issued in Chinese Patent Application No. 202310155919.7, with English machine translation (15 pages).

First Office Action and Search Report dated Aug. 6, 2026, issued in Chinese Patent Application No. 202310155992.4, with English machine translation (15 pages).

* cited by examiner

LIDAR LIGHT SOURCE AND SYSTEM

CROSS-REFERENCE TO RELATED APPLICATIONS

The application claims priority to Chinese Patent Application Nos. 202211363022.5, 202211362329.3, 202211363010.2, and 202211363009.X, all filed on Nov. 2, 2023. The entire content of all of the above-referenced applications is incorporated herein by reference.

TECHNICAL FIELD

This application relates to the field of lidar technologies, and in particular, to a lidar light source and system.

BACKGROUND

A lidar is a radar system that detects feature quantities such as a position and a speed with emitted light beams. A working principle of the lidar is as follows: A detection signal (a light beam) is emitted to a target, and then a received signal (a target echo) reflected from the target is compared with the detection signal. After appropriate processing, relevant information of the target, such as a target distance, an orientation, a height, a speed, a pose, a shape, and other parameters may be obtained. High-precision data obtained from a mobile platform through the lidar has been widely used in the field of autonomous driving.

Due to a limited power of a driving power supply, currently no feasible stationary lidar can be realized for full-coverage detection within a relatively long detection range. Currently feasible long-range detection radar solutions are mainly fixed partial-coverage vertical-cavity surface-emitting laser (VSCEL) radars, MENS and prism-based edge-emitting laser (EEL) radars, and mechanically rotatable VSCEL radars and EEL radars. Due to a limited VSCEL laser power, a detection range of the fixed partial-coverage VSCEL radars is significantly limited. Due to a complex process, the MENS and prism EEL radars have a high cost and have a high requirement on a usage status. Due to poor reliability, the mechanical rotatable VSCEL radars and the EEL radars have a short service life.

From another perspective, the current lidar solutions include a mechanical lidar, a semi-solid-state lidar, and an all-solid-state lidar. This application is an all-solid-state flash lidar.

Due to the long detection range of the lidar, a laser with high power is required. Therefore, the current semi-solid-state lidar adopts an EEL light source solution. However, the following problems exit in the solution:

(1) Consistency and reliability are poor when a plurality of EELs are used.

(2) A problem regarding heat dissipation occurs due to a high power when a single high-power EEL is used.

The above disclosed content of the background is merely used for understanding the inventive concept and the technical solution of this application, and does not necessarily belong to the existing technologies of this application. The background should not be used to evaluate the novelty and creativity of this application in absence of clear evidence indicating that the above content has been disclosed on the application date of this application.

SUMMARY

In this application, an array of EELs are employed. Each of the EELs includes an active region disposed therein. The active regions may share a cathode or an anode, thereby significantly improving emission consistency of the lasers and reducing the power of a lidar light source. Light beams are collimated and diffused through a cylindrical lens and are fused into a uniform light beam on a target surface, so that the lidar light source has desirable consistency and reliability, and has a low power and is free of a problem regarding heat dispassion, thereby facilitating implementation of a high peak power and long-distance detection.

In a first aspect, this application provides a lidar light source, including an array of EELs and a cylindrical lens.

A plurality of active regions are arranged inside the array of EELs. Light emitting ports of the plurality of active regions are disposed adjacent to each other, the plurality of active regions share a cathode and include separate anodes, or share an anode and include separate cathodes.

The cylindrical lens is configured to collimate light beams emitted from the array of EELs in a fast axis direction, and fuse the light beams emitted through the light emitting ports into a uniform light beam on a target surface.

In some embodiments, in the lidar light source, a light-emitting surface of each of the EELs is located on a focal point of the cylindrical lens.

In some embodiments, the lidar light source further includes a controller. The controller is configured to control the plurality of active regions to be in an on or off state through an addressable drive mechanism.

In some embodiments, in the lidar light source, the plurality of active regions are turned on successively, and only one of the active regions is turned on at a time.

In some embodiments, in the lidar light source, all of the active regions are turned on within an emission cycle.

In some embodiments, in the lidar light source, a distance between the array of EELs and the cylindrical lens is in a range of 0.1 mm to 1 mm.

In some embodiments, in the lidar light source, the each of the light beams is rectangular.

In some embodiments, in the lidar light source, the cylindrical lens includes a reflecting surface for changing directions of the light beams.

In a second aspect, this application provides a lidar light source, including an array of EELs and a cylindrical lens.

A plurality of active regions are arranged inside the array of EELs. Light emitting ports of the plurality of active regions are disposed adjacent to each other, the plurality of active regions share a cathode and include separate anodes, or share an anode and include separate cathodes.

The cylindrical lens is configured to collimate light beams emitted from the array of EELs in a fast axis direction.

Regions on the cylindrical lens projected by the light beams emitted from the array of EELs (from the plurality of active regions) do not overlap.

In some embodiments, in the lidar light source, a light-emitting surface of each of the EELs is located on a focal point of the cylindrical lens.

In some embodiments, in the lidar light source, an opaque pattern is arranged on each of the regions projected from the plurality of active regions on the cylindrical lens, and the plurality of opaque patterns are different from each other.

In some embodiments, in the lidar light source, the cylindrical lens includes a reflecting surface for changing directions of the light beams.

In some embodiments, in the lidar light source, the plurality of EELs are arranged in at least two rows.

In some embodiments, in the lidar light source, surfaces of the plurality of active regions are in an arc shape.

In a third aspect, this application provides a lidar light source, including an array of EELs, a cylindrical lens, and a display.

A plurality of active regions are arranged inside the array of EELs. Light emitting ports of the plurality of active regions are disposed adjacent to each other, the plurality of active regions share a cathode and include separate anodes, or share an anode and include separate cathodes.

The cylindrical lens is configured to collimate light beams emitted from the array of EELs in a fast axis direction.

The light beams emitted from the active regions are modulated into specific shapes and emitted in a form of pulses.

The display is configured to display patterns to shape the emergent light beams. The patterns do not allow the light beams to pass through.

In some embodiments, in the lidar light source, the display includes a plurality of sub-screens, a number of the sub-screens is equal to a number of the active regions, and the light beam emitted from each of the active regions is emitted through a corresponding sub-screen.

In some embodiments, the lidar light source further includes a controller. The controller is configured to control the plurality of active regions to be in an on or off state through an addressable drive mechanism.

In some embodiments, in the lidar light source, the display is configured to dynamically adjust the displayed patterns.

In a fourth aspect, this application provides a lidar system, including a lidar light source and a receiving sensor.

The lidar light source is any lidar light source described above.

The receiving sensor is synchronized to the lidar light source to receive a reflected signal of a laser for three-dimensional reconstruction.

In some embodiments, in the lidar system, the receiving sensor is divided into n sub-regions, and n is a number of the active regions.

The sub-regions are in a one-to-one correspondence with the active regions.

A sub-region is controlled to operate when a corresponding active region operates.

Compared with the existing technologies, this application has the following beneficial effects.

In this application, the array of EELs is used, and the plurality of active regions are arranged, so that a power of a single laser may be reduced, thereby reducing an instantaneous power of the light source, and reducing a power requirement on a driving power supply. Therefore, a lidar light source driven by an existing driving power supply can realize detection of a longer range.

In this application, the plurality of active regions share the anode or the cathode, so that the plurality of active regions have desirable consistency, thereby avoiding problems such as a non-uniform light beam and unstable emission caused by inconsistent positions or angles of the plurality of lasers.

In this application, the cylindrical lens is used to collimate the light beams and fuses the light beams into a uniform light beam on the target surface, so that a number of optical elements can be considerably reduced, impact of process errors on the light beams can be alleviated, quality of the laser light beams can be improved, and a size of the lidar light source can be reduced.

BRIEF DESCRIPTION OF THE DRAWINGS

In order to describe the technical solutions in embodiments of this application or in existing technologies more clearly, drawings required for describing the embodiments or existing technologies are briefly described below. Apparently, the drawings in the following description merely show embodiments of this application, and a person of ordinary skill in the art may still derive other drawings from these drawings without creative efforts. By reading detailed description of non-limiting embodiments with reference to the following drawings, other features, objectives, and advantages of this application become more apparent.

DETAILED DESCRIPTION

This application is further described below with reference to specific embodiments. The following embodiments help a person skilled in the art further understand this application, but do not limit this application in any form. It should be noted that a person of ordinary skill in the technology may make a plurality of modifications and improvements without departing from the concept of this application. All fall within the protection scope of this application.

In the specification, claims, and drawings of this application, terms "first", "second", "third", "fourth", and the like (if any) are intended to distinguish between similar objects rather than describe a specific order or sequence. It should be understood that data used in this way may be transposed where appropriate, so that the embodiments of this application described herein may be, for example, implemented in an order different from those illustrated or described herein. Moreover, terms "include", "have" and any other variants are intended to cover non-exclusive inclusion. For example, a process, method, a system, a product, or a device that includes a list of steps or units is not necessarily limited to those expressly listed steps or units, but may include other steps or units not expressly listed or inherent to such a process, method, system, product, or device.

A lidar light source and system provided in the embodiments of this application are intended to resolve problems in existing technologies.

The technical solutions of this application and how the technical solutions of this application resolve the above technical problems are described in detail below by using specific embodiments. The following specific embodiments may be combined with each other, and the same or similar concepts or processes may not be repeated in some embodiments. The embodiments of this application are described below with reference to the drawings.

In the lidar light source provided in the embodiments of this application, the EELs share an anode and include separate anodes, or share an anode and include separate cathodes. In this way, consistency and reliability of the lidar light source can be ensured, more effective control of emission can be realized, emission at different times can be realized, a power can be reduced, and a requirement on a driving power supply can be reduced. In addition, a cylindrical lens is used to collimate light beams and fuse the light beams into a uniform light beam on a target surface, which realizes desirable uniformity even at a long range.

Figure 1:
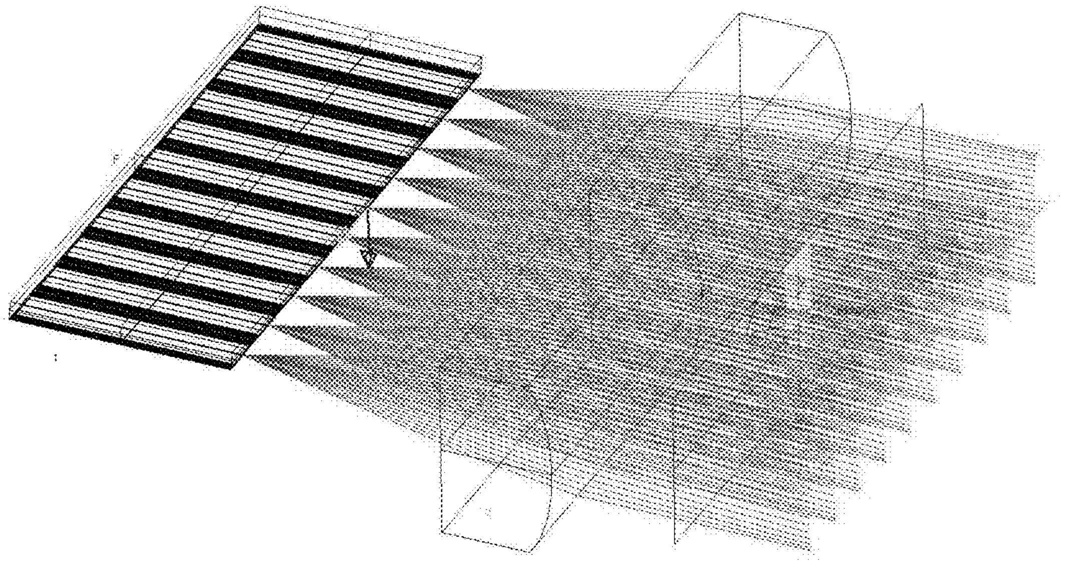
FIG. 1 is a schematic structural diagram of a lidar light source, according to an embodiment of this application.

FIG. 1 is a schematic structural diagram of a lidar light source, according to an embodiment of this application. As shown in FIG. 1, the lidar light source in this embodiment of this application includes an array of EELs 1, in which a plurality of active regions are arranged.

Figure 4:
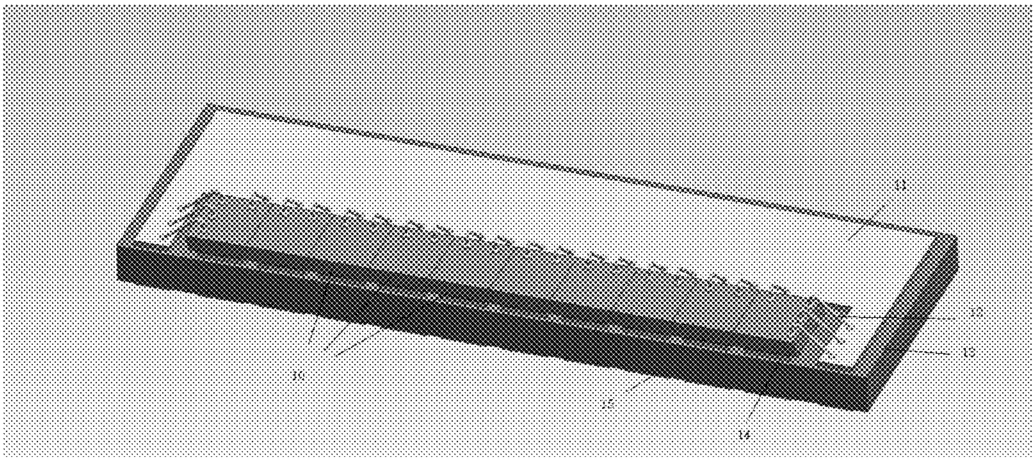
FIG. 4 is a schematic structural diagram of an array of edge-emitting lasers (EELs), according to an embodiment of this application.
Figure 5:
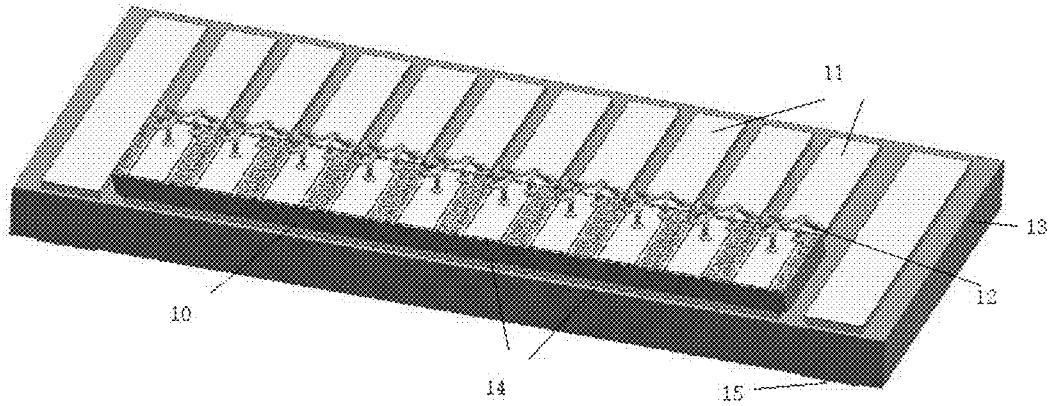
FIG. 5 is a schematic structural diagram of another array of EELs, according to an embodiment of this application.

Light emitting ports of the plurality of active regions are disposed adjacent to each other, and the plurality of active regions share a cathode and include separate anodes, or share an anode and include separate cathodes. If the plurality of active regions share an anode, the plurality of active regions include independent cathodes. If the plurality of active regions share a cathode, the plurality of active regions include independent anodes. FIG. 0.4 is a schematic diagram in which the active regions share a cathode. FIG. 0.5 is a schematic diagram in which the active regions share an anode. The specification is described by using FIG. 4 as an example. As shown in FIG. 4, a plurality of EELs 10 are arranged on a substrate 13. Cathodes of the plurality of EELs 10 are connected to an electrode plate 11 through metal (e.g., gold) wires 12, achieving an effect of sharing a cathode by the plurality of EELs 10 and facilitating control. Anodes 14 of the plurality of EELs 10 are connected to a laser emitter in the substrate 13 to control emission of the lasers. Light emitting ports 15 are arranged on the other side of the substrate 13. One light emitting port is arranged for each of the lasers. The metal wires 12 and the electrode plate 11 are both conductive materials. The substrate 13 is an insulating material. The electrode plate 11 not only provides a conduction function, but also can constrain the EELs 10, so that the array of EELs 1 can emit more stable light beams. The plurality of EELs are snugly attached to each other, so that relative positions thereof are more stable. In this way, the light beams emitted through the light emitting ports 15 are more consistent and uniform.

In some embodiments, the surface of the electrode plate 11 is on the same surface as the cathodes. The cathodes are snugly attached to the electrode plate 11, which can realize connection without the metal wires 12. Since the cathodes are snugly attached to the electrode plate 11, through a housing and a substrate, positions and directions of the lasers can be precisely controlled. In order to cause the surface of electrode plate 11 to be located on the same surface as the cathodes, a thickness of the substrate 13 may be increased, or a thickness of each of the electrode plate 11 may be increased. In case of increasing the thickness of the substrate 13, the substrate 13 below the electrode plate 11 may be made thicker, and the substrate 13 below the EELs 10 is made thinner. In case of increasing the thickness of the electrode plate 11, the substrate 13 is kept flat to facilitate production and processing of the substrate 13, and the electrode plate 11 may be located on the same surface as the cathode surfaces merely by using an increased thickness. In industrial production, a solution may be selected based on comprehensive consideration of materials and processing difficulty of the electrode plate 11 and the substrate 13, to achieve optimal costs.

Compared to a VSCEL laser, the EELs have a larger far-field divergence angle, can emit a wider light beam, and have a high power density and a high pulse peak power. A VCSEL laser may be formed as a lidar system without a movable component that incorporates a 2D emitter array and a 2D SPAD detector array, while the technical solution of this application enables an EEL array that has similar constituent detectors to be more efficient and stable in long-range detection as compared to a VSCEL laser array. A wavelength of each of the EELs used in this application may be various, feasible wavelengths such as 905 nm or 1550 nm. Based on a current industrial production capacity, 905 nm is a mainstream wavelength, since silicon absorbs photons at the wavelength. In addition, silicon-based photoelectric detectors are more mature than indium gallium arsenide (InGaAs) near-infrared detectors required to detect light at 1550 nm, and therefore are inevitably chosen for a large number of applications taking costs and overall maturity into consideration and have a higher cost efficiency. A laser at 1550 nm is far away from a visible light spectrum of human eyes, and a laser at 1550 nm with the same power has a safety level 40 times higher than that of a laser at 905 nm. 1550 nm is a wavelength with an expectable enormous potential in the future.

A cylindrical lens 2 is configured to collimate light beams emitted from the array of EELs in a fast axis direction, and fuse the light beams emitted through the light emitting ports into a uniform light beam on a target surface.

The cylindrical lens 2 is a lens at a fixed position with respect to the EELs. In this embodiment, the light beams are collimated only in the fast axis direction, and do not need to be collimated in a slow axis or another direction. In this way, a requirement on the cylindrical lens can be reduced, which ensures a desirable projection effect while reducing costs. The cylindrical lens 2 collimates and shapes the laser light beams emitted from all of the EELs, so that the light beams are fused into a uniform light beam on the target surface after passing through the cylindrical lens 2. A light-emitting surface of each of the array of EELs 1 is located on a focal point of the cylindrical lens 2. The light-emitting surface is a surface composed of the plurality light emitting ports. The cylindrical lens 2 has a specific degree of curvature for shaping the light beams. A distance between the cylindrical lens 2 and the array of EELs is in a range of 0.1 mm to 1 mm, to minimize a size of the lidar light source. The cylindrical lens 2 may be a common lens, a superlens, or the like. When the cylindrical lens is a superlens, the size of the lidar light source may be significantly reduced.

Figure 2:
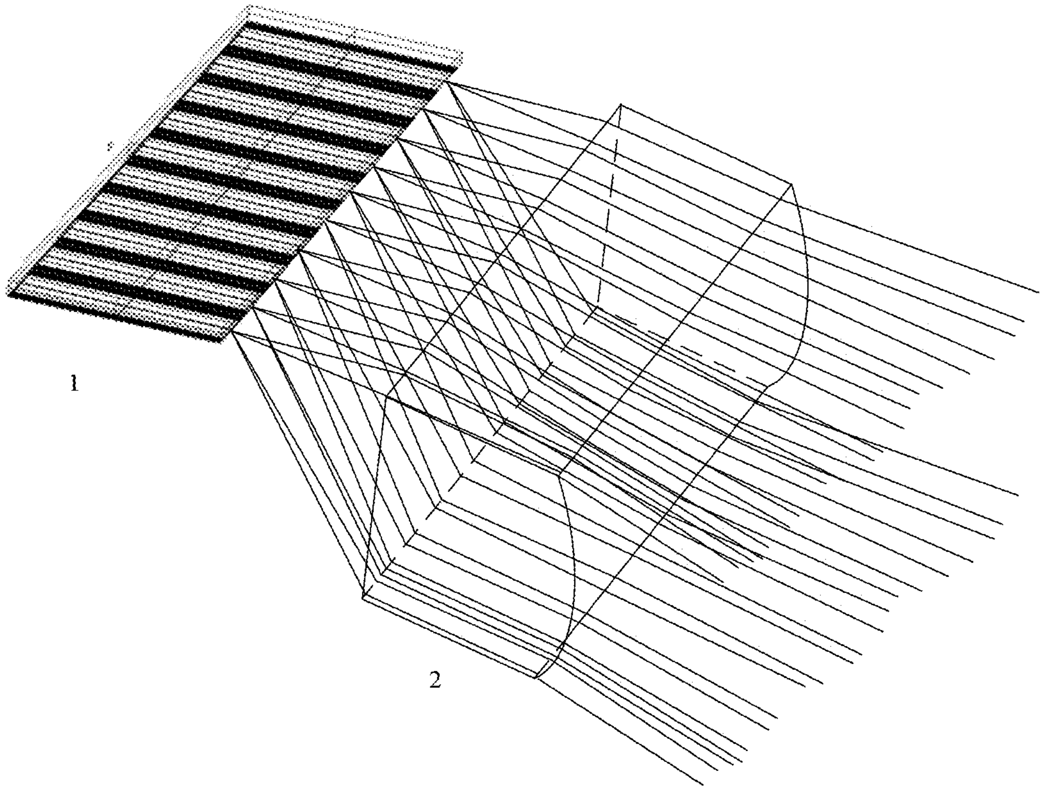
FIG. 2 is a schematic structural diagram of another lidar light source, according to an embodiment of this application.

FIG. 2 is a schematic structural diagram of another lidar light source according to an embodiment of this application. As shown in FIG. 2, compared to that in the foregoing embodiments, a cylindrical lens 2 in this embodiment of this application is configured to collimate light beams emitted from array of EELs in a fast axis direction.

The cylindrical lens 2 is a lens at a fixed a position relative to the array of EELs. Regions on the cylindrical lens projected by the light beams emitted from the array of EELs (from the plurality of active regions) do not overlap. The regions projected from the plurality of active regions on the cylindrical lens do not fully cover the cylindrical lens, that is, the cylindrical lens has regions not illuminated by the active regions, to ensure independent operability of the light beam in each active region. A light-emitting surface of each of the array of EELs 1 is located on a focal point of the cylindrical lens 2.

In this embodiment, the regions on the cylindrical lens projected by the light beams emitted from the array of EELs (from the plurality of active regions) do not overlap, so that the light beams of the plurality of array-type lasers are spaced apart from each other, thereby facilitating an optical operation on each light beam, and increasing an information density of the light beams projected from the different active regions. In this embodiment, separate illumination on different regions is achieved without a need to arrange a scanning system, which simplifies a system, and improves stability.

Figure 3:
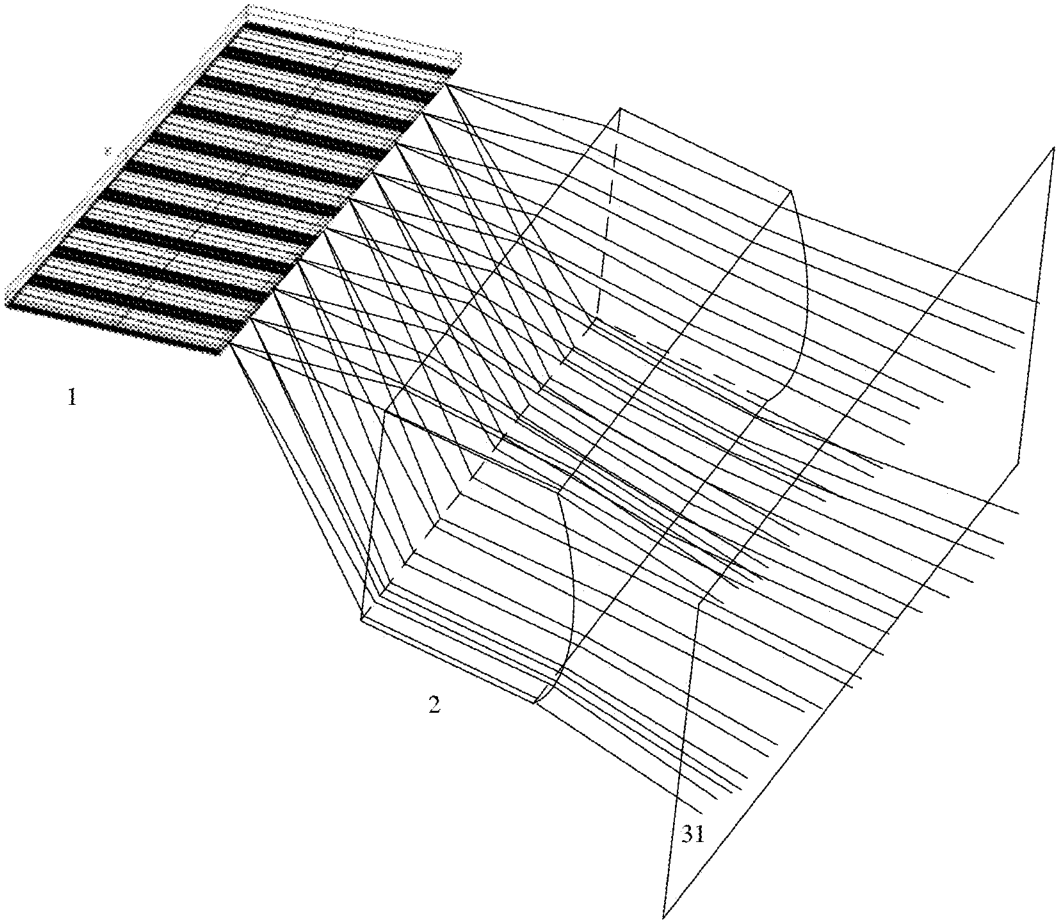
FIG. 3 is a schematic structural diagram of still another lidar light source, according to an embodiment of this application.

FIG. 3 is a schematic structural diagram of still another lidar light source according to an embodiment of this application. As shown in FIG. 3, compared to those in the foregoing embodiments, the lidar light source in this embodiment of this application further includes a display 31 configured to display patterns to shape light beams into specific patterns.

Figure 6:
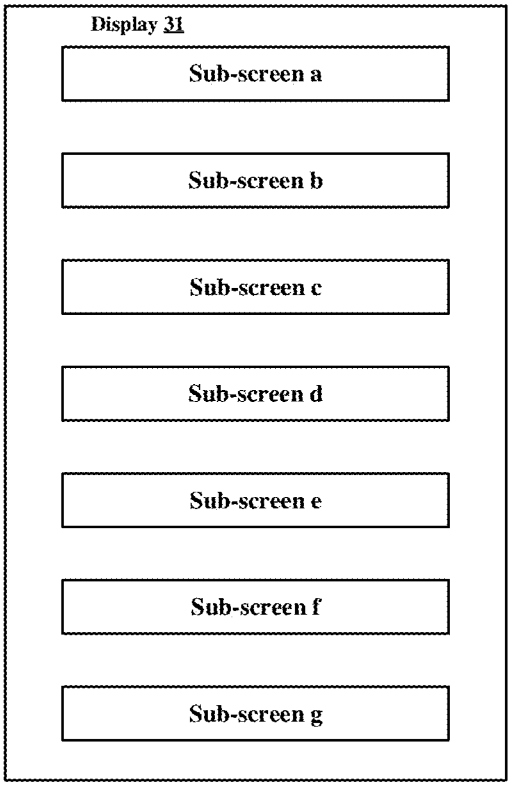
FIG. 6 is a schematic structural diagram of a display, according to an embodiment of this application.

The patterns of the display do not allow the light beams to pass through, and regions without patterns allow the light beams to pass through. As shown in FIG. 6, the display 31 may include a plurality of sub-screens. 7 sub-screens are illustrated in FIG. 6. However, in some embodiment, a number of the sub-screens is equal to a number of active regions, and the light beam emitted from each of the active regions is emitted through a corresponding sub-screen. The light beams are emitted from the active regions and successively pass through a cylindrical lens and the display. The light beams emitted from the active regions pass through the cylindrical lens and then illuminate corresponding sub-screens. Different sub-screens do not overlap. A gap exists between adjacent sub-screens. The sub-screens are defined through division of a region on the display, and are configured to display different patterns. In some embodiments, the plurality of sub-screens may be a plurality of different regions on the display. The display may be various types of displays such as an LED screen or an OLED screen. The display may be used to adjust the display patterns, and to separately adjust a pattern displayed on a sub-screen. Each sub-screen of the display may be configured to have two states: displaying a pattern and not displaying a pattern. In the state of displaying a pattern, a light beam passing through the sub-screen becomes a light beam with the pattern and may be used for structured light measurement. In the state of not displaying a pattern, the light beam passes through the sub-screen and may be used for TOF measurement.

In this embodiment, the display displays the patterns to shape the emergent light beams, and depth data may be calculated by using a deformation of the patterns. In this way, not only TOF depth data is obtained, but also structured light depth data may be obtained. In this embodiment, through display of the patterns on the display to process the emergent light beams, a fast changing characteristic of the display can be fully utilized, so that the emergent light beams can be quickly switched between different shapes.

In some embodiments, as shown in FIG. 1, the plurality of light emitting ports are located in a row. Since the light beams emitted from the EELs are elliptical, the light beams become rectangular after passing through the cylindrical lens 2. Each of the plurality of light emitting ports may be independently turned on. Light beams emitted from the array-type TOF light source via the light emitting ports do not overlap each other. The light beam emitted from an EEL illuminates a partial region of a target surface and is rectangular on the target surface. The light emitting port is a light-emitting port of the active region. One active region corresponds to one light emitting port.

In some embodiments, the lidar light source further includes a controller that may control the plurality of active regions to be in an on or off state through an addressable drive mechanism. The plurality of active regions are turned on successively, or only one of the active regions is turned on at a time. All of the active regions are turned on within an emission cycle. The expression "the active regions are turned on successively" means that the active regions are turned on successively at a very small time interval, and does not mean that the active regions are successively turned on one after another. In fact, a propagation time of a laser light beam will last at a relatively long detection range. Therefore, if adjacent active regions project light beams in a relatively short time, the light beams may interfere with each other at a data receiving end due to factors such as light overflow. In this embodiment, the active regions may be turned on successively at an equal interval not less than 2. For example, the active regions are numbered as 1, 2, 3 . . . , 20 from left to right. If the interval is 2, the active regions are turned on in a sequence of 1, 3, 5, 7, 9, 11, 13, 15, 17, 19, 2, 4, 6, 8, 10, 12, 14, 16, 18, 20. In this embodiment, after one cycle of turn-on at the equal interval is completed, active regions not turned on are further turned on at the equal interval until all of the active regions are turned on, to achieve an efficient and controllable turn-on process. When controlling the active regions to be turned on or off, the controller controls the patterns in the sub-screens on the display to be displayed or not, thereby achieving synchronous updating of the active regions and the display. In some embodiments, within an emission cycle, the controller updates the display only once and synchronously updates all of the sub-screens, so that all of the sub-screens adapt to the active regions within the emission cycle, thereby reducing a refresh frequency of the display and prolonging a service life of the display.

Figure 7:
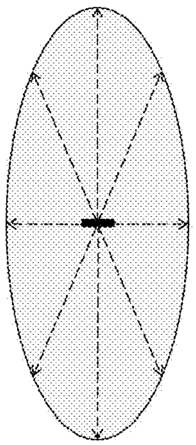
FIG. 7 is a schematic sectional view of a single light emitting port, according to an embodiment of this application.

In some embodiments, as shown in FIG. 1, the plurality of light emitting ports are located in a row. As shown in FIG. 7, a light beam emitted from an EEL is elliptical. A fast axis is the longest axis, and a slow axis is the shortest axis. A light beam becomes rectangular after processing by the cylindrical lens 2. Each of the plurality of light emitting ports is independently turned on. Light beams emitted from the lidar light source via the light emitting ports do not overlap each other. The light beam emitted from an EEL illuminates a partial region of a target surface and is rectangular on the target surface. The light emitting port is a light-emitting port of the active region. One active region corresponds to one light emitting port.

Figure 8:
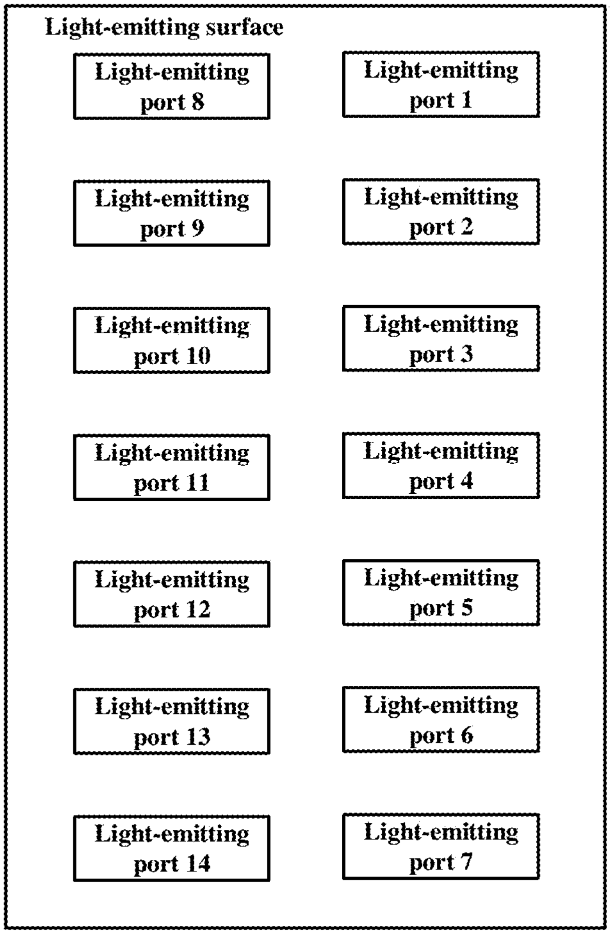
FIG. 8 is a schematic structural diagram of a light emitting surface, according to an embodiment of this application.

In some embodiments, as shown in FIG. 8, the plurality of light emitting ports are located in at least two rows. Since the light beams emitted from the EELs are elliptical, the EELs are not uniformly arranged on a substrate, but arranged with a transverse spacing being less than a longitudinal spacing. Since the light beam projected by the single EEL is not circular, different projection effects may be achieved through designing of a direction and a position of the projection of the EEL. For example, the light beams projected by the EELs are elliptical. If the EELs are connected in the fast axis direction, a thin and long line scanning region is formed to obtain a largest viewing angle width. If the lasers are connected in the slow axis direction, a thick and long line scanning region is formed to obtain a scanning range closest to a square. Further, the cylindrical lens 2 shapes the light beams so that the light beams become rectangular. When the emergent light beams are rectangular, the light beams can illuminate a target region more effectively without a dead corner, thereby achieving full coverage of the target region, and can illuminate the target region more uniformly.

Figure 9:
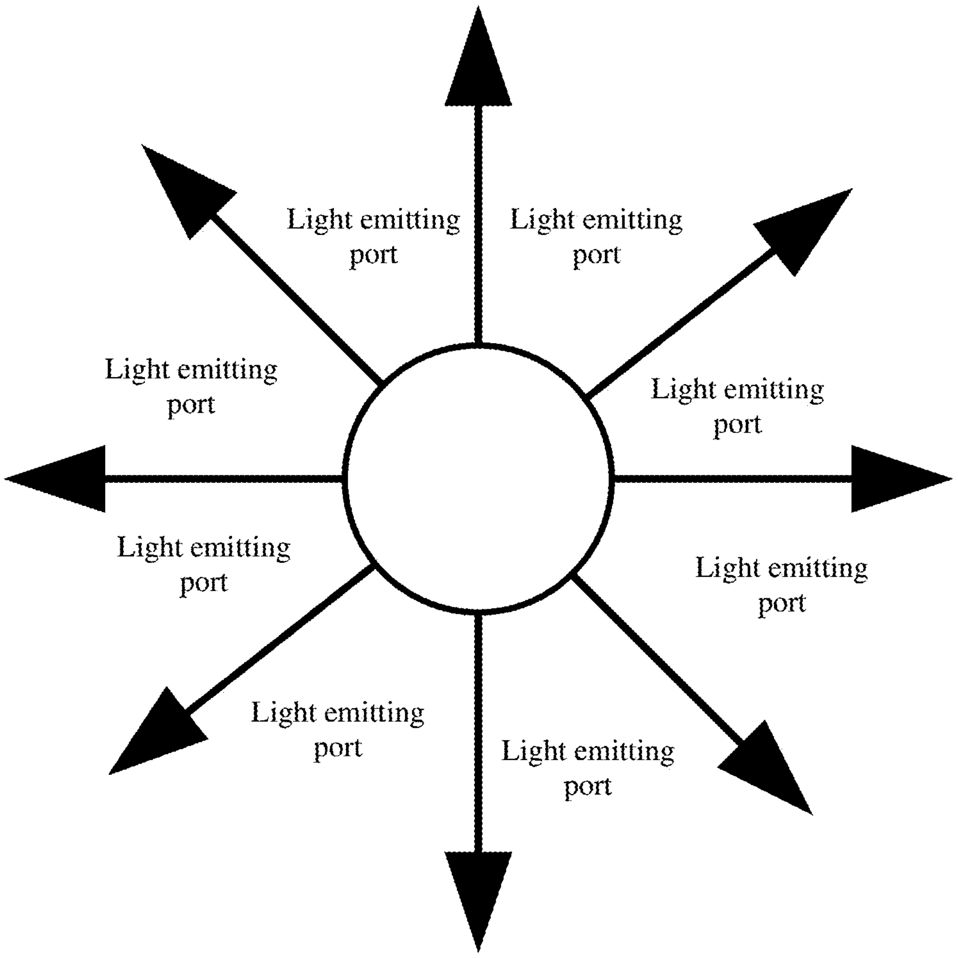
FIG. 9 is a schematic structural diagram of another light emitting port, according to an embodiment of this application.

In some embodiments, as shown in FIG. 9, the plurality of light emitting ports are located around a circle and oriented in different directions. In this embodiment, the cylindrical lens may further shape a light beam angle, so that the plurality of emergent light beams can achieve 360-degree full coverage. In this embodiment, after light beams emitted through adjacent light emitting ports pass through the cylindrical lens 2, laser illuminated regions are also adjacent to each other, thereby achieving 360-degree full coverage. In some embodiments, the cylindrical lens shapes the light beams emitted through the light emitting ports into a rectangular shape. Similar to the foregoing embodiments, the lidar light source in this embodiment may also achieve scanning in different ranges through laser angle designing. For example, when a short edge of a light beam projected by the lidar light source is connected to a short edge of an adjacent light beam, a number of EEL light sources required for achieving 360-degree full coverage is minimized. When a long edge of the light beam projected by the lidar light source is connected to a long edge of the adjacent light beam, the number of EEL light sources required for achieving 360-degree full coverage become larger, but a largest coverage area is achieved. This embodiment may be applied to various monitoring equipment, such as drones and mobile robots, to achieve all-round monitoring of an environment.

In some embodiments, the lidar light source further includes a controller that may control the plurality of active regions to be in an on or off state through an addressable drive mechanism. The plurality of active regions are turned on successively, or only one of the active regions is turned on at a time. All of the active regions are turned on within an emission cycle. The expression “the active regions are turned on successively” means that the active regions are turned on successively at a very small time interval, and does not mean that the active regions are successively turned on one after another. In some embodiments, a propagation time of a laser light beam will last at a relatively long detection range. Therefore, if adjacent active regions project light beams in a relatively short time, the light beams may interfere with each other at a data receiving end due to factors such as light overflow. In this embodiment, the active regions are turned on successively at an equal interval not less than 2. For example, the active regions are numbered as 1, 2, 3 . . . , 20 from left to right. If the interval is 2, the active regions are turned on in a sequence of 1, 3, 5, 7, 9, 11, 13, 15, 17, 19, 2, 4, 6, 8, 10, 12, 14, 16, 18, 20. In this embodiment, after one cycle of turn-on at the equal interval is completed, active regions not turned on are further turned on at the equal interval until all of the active regions are turned on, to achieve an efficient and controllable turn-on process.

Figure 10:
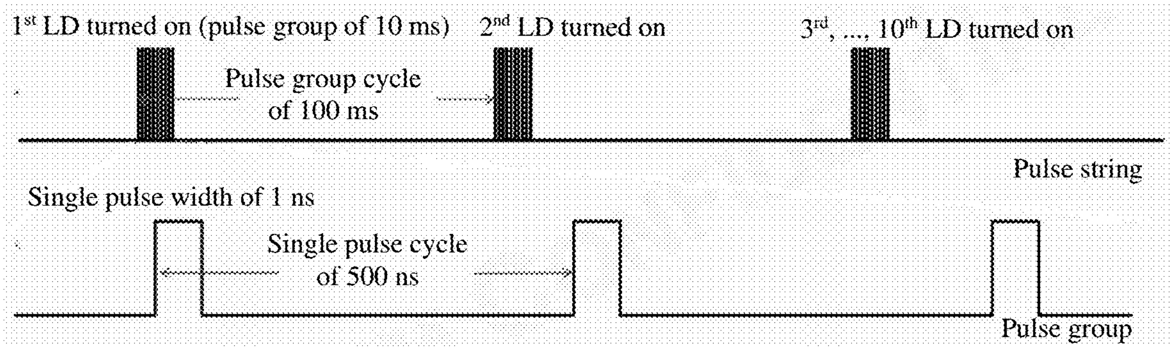
FIG. 10 is a schematic diagram of a laser pulse timing, according to an embodiment of this application.

FIG. 10 is a schematic diagram of a laser pulse timing. A plurality of emission cycles are shown in an upper part of FIG. 10. With reference to FIG. 10, within an emission cycle, the lidar light source performs emission in a form of pulse groups. In the upper part of FIG. 10, one emission cycle is 10 ms, and a difference between emission start moments of two adjacent emission cycles is 100 ms. That is to say, if a first pulse emission moment is 0s, subsequent pulse emission moments are 100 ms, 200 ms, 300 ms, et al. Since a scanning sequence is fixed, an emission interval of each active region is the same as a pulse group cycle of each active region, and the emission intervals of the plurality of active regions are the same, thereby ensuring stability of scanning. A lower part of FIG. 10 shows an emission cycle, that is, a pulse group. The pulse group includes a plurality of single pulses with fixed intervals. As shown in the lower part of FIG. 10, one pulse group includes 20 single pulses, a duration of each of the single pulses is 1 ns, and an interval between the starts of the pulse is 500 ns.

Figure 11:
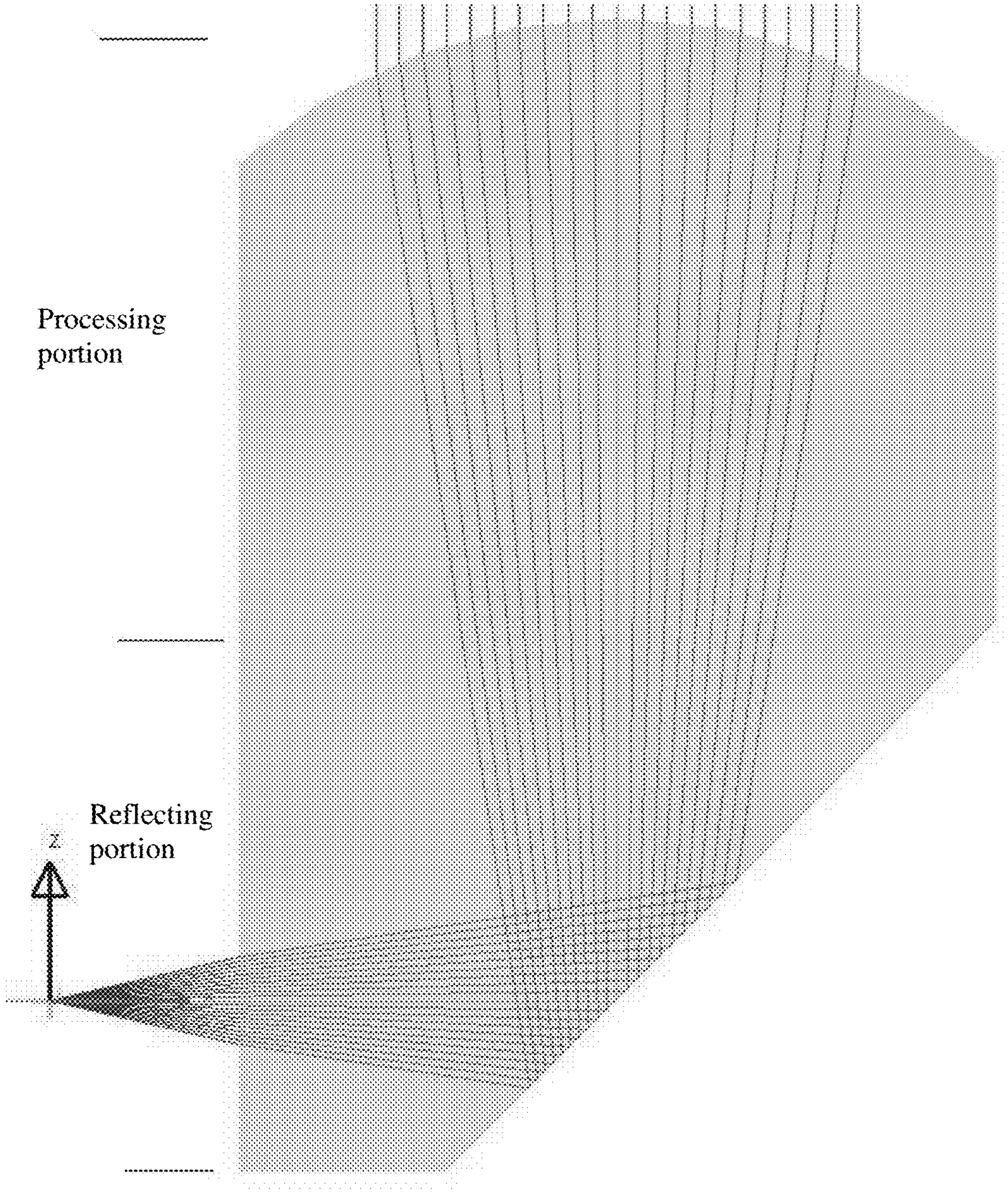
FIG. 11 is a schematic structural diagram of another cylindrical lens, according to an embodiment of this application.

FIG. 11 is a schematic structural diagram of another cylindrical lens. The cylindrical lens in FIG. 11 includes a reflecting surface for changing directions of the light beams. Although the cylindrical lens shown in FIG. 11 changes the directions of the light beams by 90 degrees, a person skilled in the art may understand that, in this embodiment, a change of any angle such as 30 degrees, 60 degrees, 80 degrees, 100 degrees, 120 degrees, 130 degrees, or 150 degrees of the light beams may be achieved though change of an included angle between the reflecting surface and an incident light. In this embodiment, the cylindrical lens includes a processing portion and a reflecting portion. The reflecting portion includes an incident surface and a reflecting surface, and is configured to change the angles of the light beams. The incident surface is perpendicular to the directions of the light beams. A height of the reflecting portion is not less than heights of the light beams at the cylindrical lens, and a width of the reflecting portion is not less than widths of the light beams at the cylindrical lens. The processing portion and the reflecting portion are integrally formed to allow light beams reflected from the reflecting portion to pass through for emission, and are used for collimation, shaping, and the like of the light beams. A direction of the processing portion is the same as advancement directions of the light beams reflected by the reflecting surface. In this embodiment, the emission angles of the laser light beams can be changed to any angle, thereby achieving applications in various scenarios to meet various application requirements.

Figure 12:
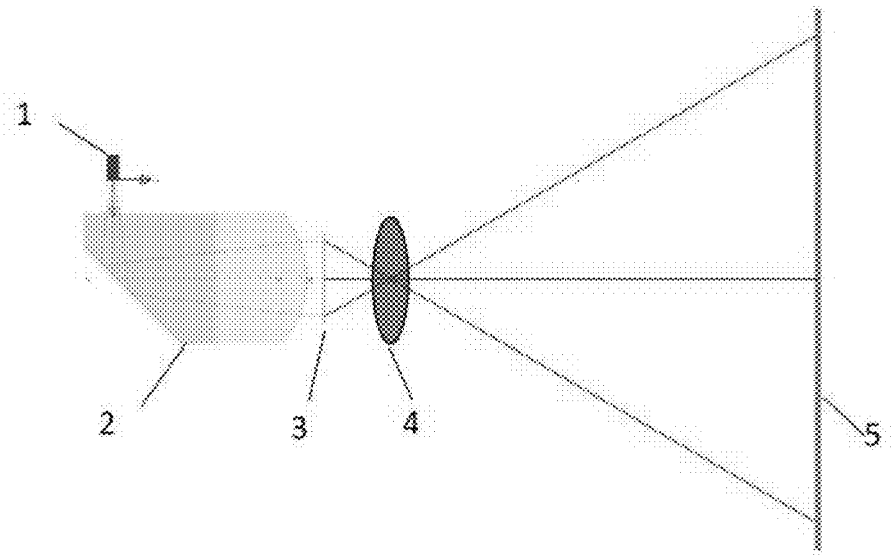
FIG. 12 is a schematic structural diagram of a lidar emitting end, according to an embodiment of this application.

FIG. 12 is a schematic structural diagram of a lidar emitting end. Compared to the foregoing embodiments, in this embodiment, after a light beam passes through a cylindrical lens, the light beam passes through an intermediate imaging surface 3 and a projection lens 4, and is then projected onto a target surface 5. The intermediate imaging surface 3 is configured to further shape the light beam to achieve a better imaging result. The intermediate imaging surface 3 may be either a single optical element or a plurality of optical elements. The intermediate imaging surface 3 may be either a traditional optical element or a new type of optical element such as a superlens. The projection lens 4 is configured to project light spots passing through the intermediate imaging surface 3 into an image on the target surface 5. As shown in FIG. 12, an area of a lidar light source on the target surface 5 increases as a distance between the target surface and the lidar light source increases. Correspondingly, a laser density per unit area on the target surface decreases. Therefore, the intermediate imaging surface 3 and the projection lens 4 at corresponding operating distances need to be selected based on different application requirements, so that the lidar light source can clearly detect data of a target object at an operating distance.

Figure 13:
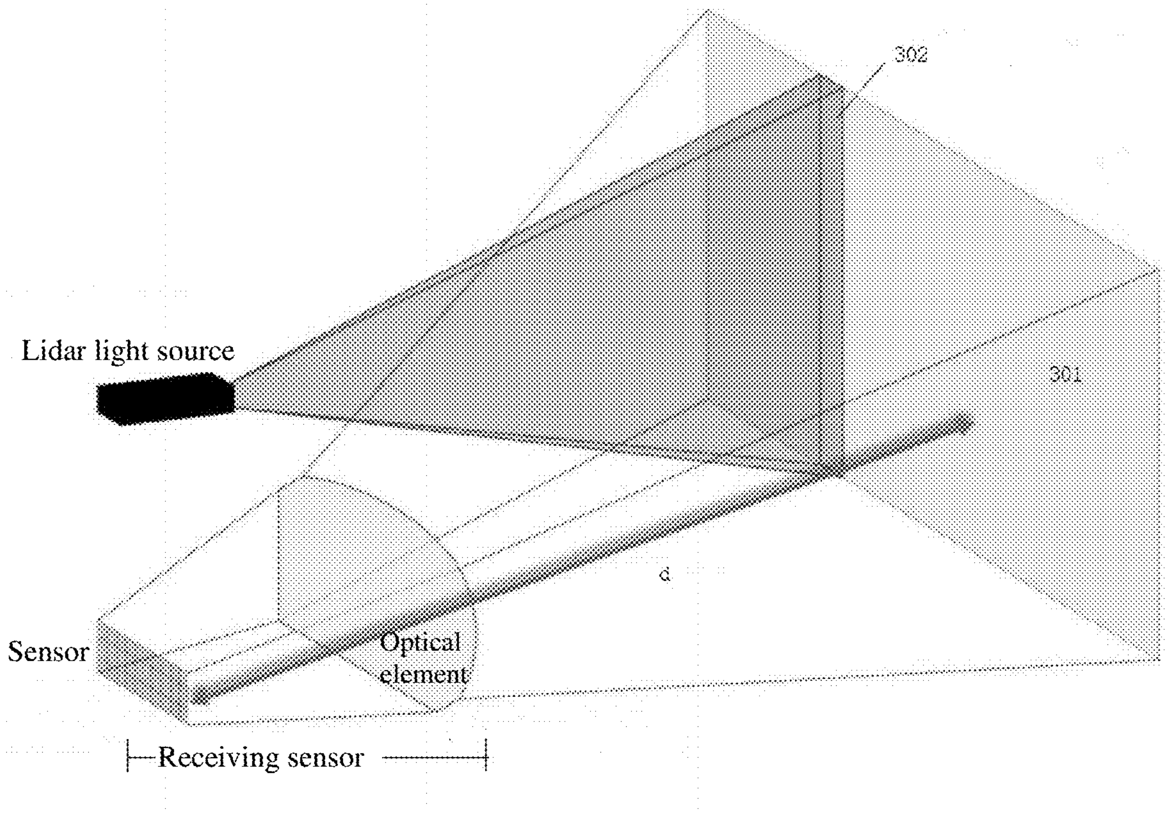
FIG. 13 is a schematic operating diagram of a lidar system, according to an embodiment of this application.

FIG. 13 is a schematic structural diagram of a lidar system, according to an embodiment of this application. As shown in FIG. 13, the lidar system in this embodiment of this application includes a lidar light source and a receiving sensor.

The lidar light source may be the lidar light source in any of foregoing embodiments.

The receiving sensor is synchronized to the lidar light source to receive a reflected signal of a laser for three-dimensional reconstruction.

The lidar light source turns on its active regions successively, to achieve a plurality of pulsed emissions within an emission cycle. The receiving sensor performs adjustment in synchronization with the lidar light source for receiving a reflected signal of a laser pulse. A depth value of a target region may be calculated based on a time difference between a moment at which the signal is received by the receiving sensor and a moment at which the signal is emitted by the lidar. $d=(t1-t2)*c/2$, where $t1$ is the moment at which the receiving sensor receives the signal, $t2$ is the moment at which the lidar emits the signal, c is the propagation speed of light, that is, 299,792,458 meters/second, and d is a distance (that is, the depth value) between the target object and the lidar system. The depth value of the target region maybe be calculated based on the formula. Then, through other position information, three-dimensional information of the target region may be restored, that is, the three-dimensional reconstruction may be performed.

Within one emission cycle, a complete target region 301 may be detected, but each pulse covers only a target region 302. A plurality of target regions 302 are pieced together to form the complete target region 301. d is the distance between the target region and a sensor in the receiving sensor, rather than a distance to a front-end optical element of the receiving sensor. A scanning sequence of the lidar light source may be random, that is, an operating sequence of the active regions may be random. The receiving sensor operates synchronously with the lidar light source. When the operating sequence of the active regions is random, switching efficiency of the active regions is high, and conversion can be quickly achieved, which improves efficiency and reduces a computational load of the lidar system.

Figure 14:
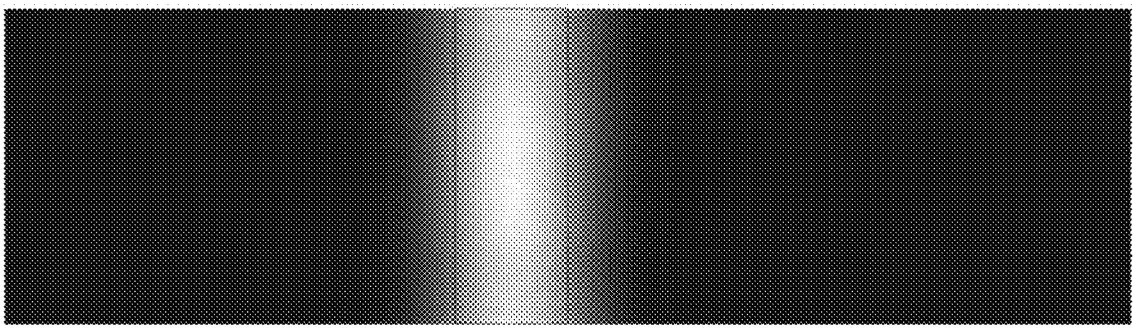
FIG. 14 is a schematic diagram of a light spot projected by a laser projector, according to an embodiment of this application.

FIG. 14 is a schematic diagram of a light spot projected by a lidar projector. After a light beam is processed by a cylindrical lens, an emitted light spot is in a specific shape, such as the rectangular shape in the embodiments. However, due to factors such as process and optical characteristics, the light spot emitted through the cylindrical lens may not achieve an expected, strict rectangle shape, but presents a shape with blurry edges. Apparently, the light spot with non-uniform edges is detrimental to obtaining of an accurate result. Therefore, in this embodiment, only a relatively uniform portion (e.g., within the box of FIG. 14) of the light spot is used as an effective projection region, and the blurry region is considered as an ineffective projection region. A box in FIG. 14 is a relatively uniform region, which can be used as an effective region.

Figure 15:
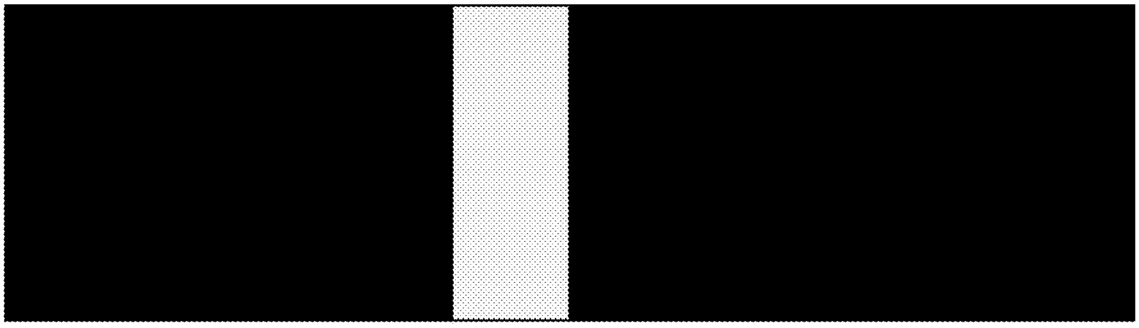
FIG. 15 is a schematic diagram of an enabled region of a sensor, according to an embodiment of this application.

FIG. 15 is a schematic diagram of an enabled region of a sensor. Corresponding to FIG. 14, only a portion of a region of the sensor is enabled, and the enabled region corresponds to an enabled region of an array of EELs to filter out a signal from the ineffective projection region, so as to ensure the quality of a received signal. The receiving sensor is divided into n sub-regions. n is a number of the active regions; the sub-regions are in a one-to-one correspondence with the active regions; a sub-region is controlled to operate when a corresponding active region operates. A proportion of an area of the sub-regions in an area of the receiving sensor is the same as a proportion of an area of the active region in an area of the array of EELs. From another perspective, due to the ineffective projection region, the active regions that are turned on successively cannot be adjacent to each other, to avoid interference of a stray light in the ineffective projection region. Since the active regions are in a one-to-one correspondence with the sub-regions, sub-regions corresponding to adjacent active regions are also adjacent to each other. Therefore, the active regions enabled successively during projection of the laser projector are not adjacent to each other, to improve data quality.

Figure 16:
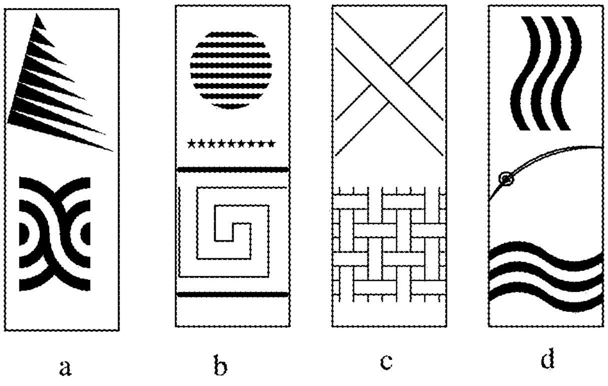
FIG. 16 shows a plurality of light spot patterns, according to an embodiment of this application.

FIG. 16 shows a plurality of light spot patterns, according to an embodiment of this application. The patterns are arranged on a surface of the cylindrical lens 2 for receiving the light beams and are in a one-to-one correspondence with the active regions. The patterns corresponding to the active regions are different. The patterns are opaque to form various patterns. In some embodiments, the patterns have many shapes and include thin lines to enable more lasers to pass through and achieve a large illumination area.

Figure 17:
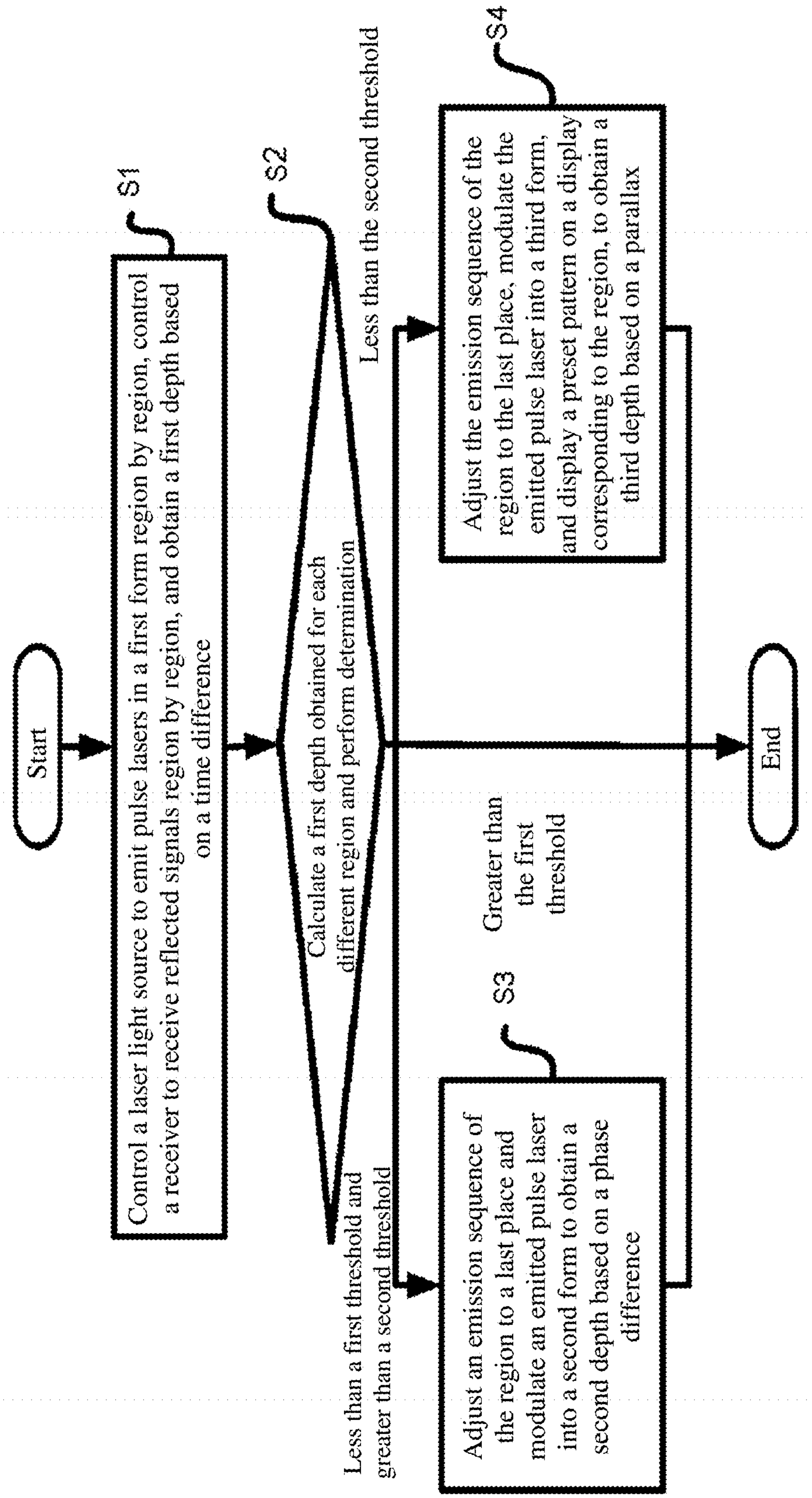
FIG. 17 is a flowchart of a laser system switching method, according to an embodiment of this application.

FIG. 17 is a flowchart of a laser system switching method, according to an embodiment of this application. As shown in FIG. 17, the laser system switching method in this embodiment includes the following steps:

Step S1: Controlling a laser light source to emit pulse lasers in a first form region by region, controlling a receiver to receive reflected signals region by region, and obtaining a first depth based on a time difference.

In this step, the laser light source has a plurality of regions, and the receiver further has a plurality of regions. The regions of the laser light source and the regions of the receiver are equal in number and are in a one-to-one correspondence. Each of the plurality of emitting region corresponds to one laser emitter. The pulse lasers emitted in the first form have a minimum pulse duration. In this embodiment, emissions in the plurality of different regions are performed in the first form to obtain the first depth.

Step S2: Calculating a first depth obtained for each different region and performing determination. If the first depth is greater than a first threshold, a current state is not changed. If the first depth is less than the first threshold and greater than a second threshold, step S3 is performed. If the first depth is less than the second threshold, step S4 is performed.

In this step, emissions in all of the regions are performed in the first form in step S1, but the target object may not be within an effective measurement range of dTOF. Therefore, corresponding regions need to be corrected. Values of the first depths of the different regions are calculated and determination is performed separately, and subsequent steps are determined. Since the depth of the target object in each different region is not a single value, and even differs significantly in some cases, in this embodiment, a minimum depth value of the region is used as a depth value of the region. This step is to process the corresponding regions after an emission cycle is completed, that is, steps S3 and S4 are performed after a pulse string is completed.

Step S3: Adjusting an emission sequence of the region to a last place and modulating an emitted pulse laser into a second form to obtain a second depth based on a phase difference.

In this step, a region for which depth data is obtained by using an iTOF technology is configured to perform emission later. A plurality of regions may be adjusted during the sequence adjustment. During sequence adjustment, a current region is not transposed with a current last region, but the current region is placed after the current last region. For example, a current region emission sequence is ABCDEFGHIJKLM, where C is a region that needs to be adjusted in this step, and a current last region is M. If C is placed after M, a new emission sequence ABDEFGHIJKLMC is obtained.

In some embodiments, the second form is a pulse modulated laser. Compared to the first form, an emission time in a single region is prolonged for the second form, which facilitates conversion and implementation, and reduces impact of an ambient light.

In some embodiments, the second form is a sine modulated laser. Compared to the first form, in addition to the prolonging of the emission time, the laser needs to be modulated into a sine wave for the second form, thereby allowing the use of a full set of products with a more mature technology.

Step S4: Adjusting the emission sequence of the region to the last place, modulating the emitted pulse laser into a third form, and displaying a preset pattern on a display corresponding to the region, to obtain a third depth based on a parallax.

In this step, a region for which depth data is obtained by using a structured light technology is configured to perform emission later. The sequence adjustment in this step is similar to that in step S3. The pulse laser emitted from the laser light source is emitted after passing through the display. The display is divided into a plurality of different regions and are in a one-to-one correspondence with the regions of the laser light source. A pulse laser emitted from a particular region of the laser light source penetrates a particular region of the display and is then emitted. When a particular pattern is displayed on the display, a region with the pattern cannot be penetrated by the pulse laser, so that the penetrated pulse laser shows a specific shape. That is to say, the third depth may be obtained based on a deformation of the pattern (a parallax principle).

In this embodiment, the laser light source emits pulse lasers region by region, which can reduce an instantaneous power of the laser light source and reduce a requirement for a driving power supply. In addition, due to a limited power of the driving power supply, the laser light source in this embodiment may have a higher output power, thereby realizing detection in a longer range. In this embodiment, the laser light source can emit three different light beams within one emission cycle, so that an appropriate laser type may be selected based on a distance to a target object, thereby obtaining precise depth data through an optimal depth measurement technology. In this embodiment, the emission sequence is adjusted based on different light source types, to ensure that a pulse required for dTOF is emitted first and other pulses are emitted later, so that times between adjacent pulse lasers are fixed and have high consistency, and durations of the emission cycles may be different.

Figure 18:
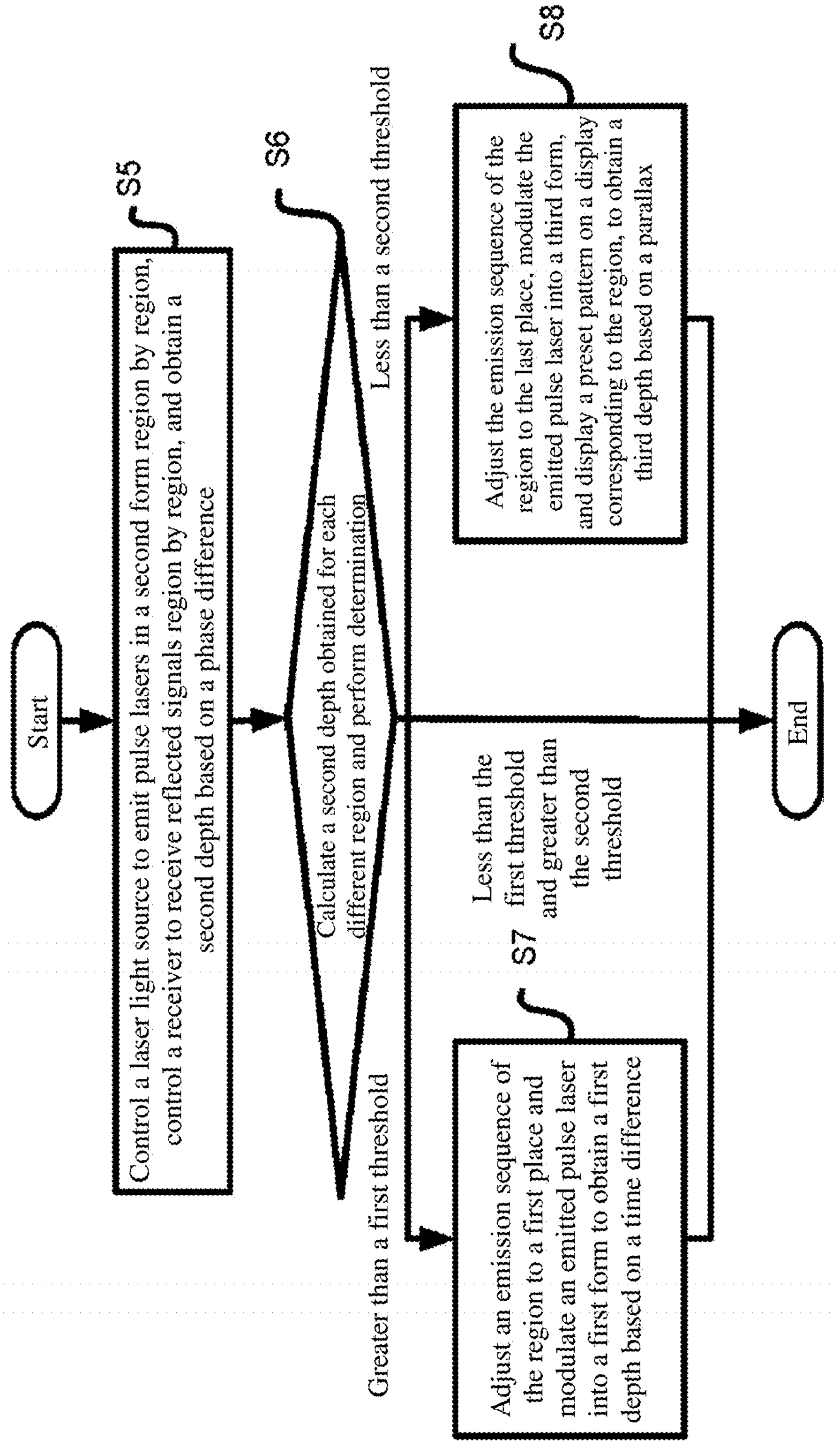
FIG. 18 is flowchart of another laser system switching method according to an embodiment of this application.

FIG. 18 is flowchart of another laser system switching method according to an embodiment of this application. As shown in FIG. 18, the laser system switching method in this embodiment of this application includes the following steps:

Step S5: Controlling a laser light source to emit pulse lasers in a second form region by region, controlling a receiver to receive reflected signals region by region, and obtaining a second depth based on a phase difference.

In this step, the regions of the laser light source and the regions of the receiver are in a one-to-one correspondence. Compared to the foregoing embodiments, in this embodiment, during initial emission, the laser light source emits the pulse lasers in the second form, that is, uses the iTOF technology. Since an effective range of the iTOF technology is usually between that of a dTOF technology and that of a structured light technology, a distance to a target object can be recognized more effectively.

Step S6: Calculating a second depth obtained for each different region and performing determination. If the second depth is greater than a first threshold, step S7 is performed. If the second depth is less than the first threshold and greater than a second threshold, a current state is not changed. If the second depth is less than the second threshold, step S8 is performed.

In this step, due to a winding effect, a distance to a target region may be mistakenly determined by using the dTOF technology. For example, when an effective measurement distance of dTOF is in a range of 0.5 m to 5 m, a target object at 6 m away may be recognized as being located at 1 m away. In this case, the region may be scanned by using the structured light technology to resolve the problem. Therefore, precision of the measurement data can be effectively increased during execution of subsequent steps.

Step S7: Adjusting an emission sequence of the region to a first place and modulating an emitted pulse laser into a first form to obtain a first depth based on a time difference.

In this step, a relatively far region is modulated into the first form, and an emission sequence thereof is adjusted to the first place, so that a farthest target object can be recognized at a close time interval, thereby quickly obtaining depth data of the relatively far target object.

Step S8: Adjusting the emission sequence of the region to the last place, modulating the emitted pulse laser into a third form, and displaying a preset pattern on a display corresponding to the region, to obtain a third depth based on a parallax.

In this step, a region using the parallax principle is adjusted to the last place to ensure that the pulse laser in the first form is emitted first.

In this embodiment, the iTOF technology is set for an initial emission mode, so that data about various distances can be effectively classified, and an optimal detection method can be obtained for each different region, thereby increasing data acquisition accuracy and precision.

Figure 19:
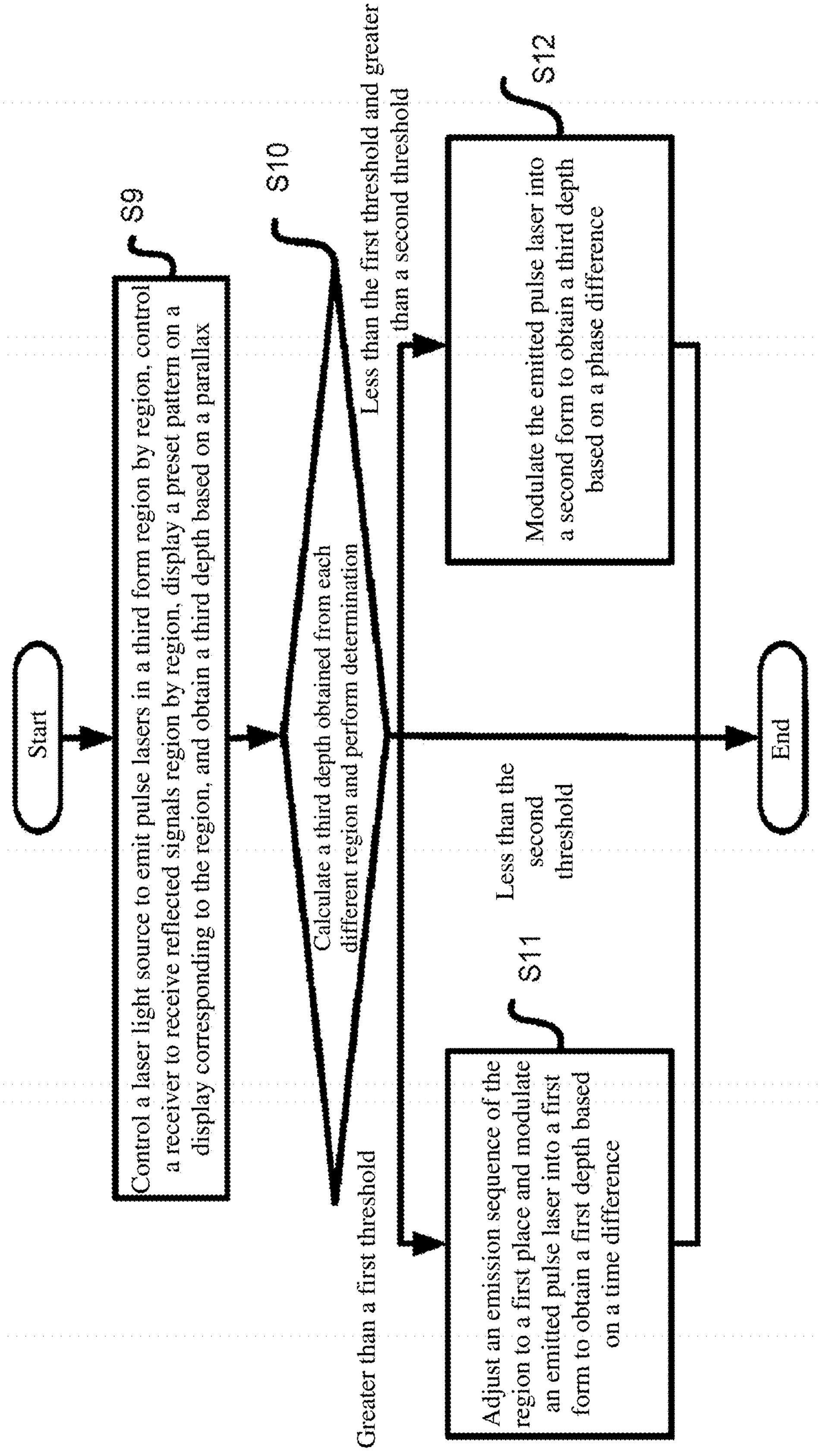
FIG. 19 is flowchart of still another laser system switching method, according to an embodiment of this application.

FIG. 19 is flowchart of steps of still another laser system switching method, according to an embodiment of this application. As shown in FIG. 19, the laser system switching method in this embodiment of this application includes the following steps:

Step S9: Controlling a laser light source to emit pulse lasers in a third form region by region, controlling a receiver to receive reflected signals region by region, displaying a preset pattern on a display corresponding to the region, and obtaining a third depth based on a parallax.

In this step, an initial emission mode is set to a structured light mode. The regions of the laser light source and the regions of the receiver are in a one-to-one correspondence. Since data obtained in the structured light mode is more stable and reliable, target regions at various distances may be accurately classified. Compared with the foregoing embodiments, since the structured light technology requires a larger amount of calculation compared with the TOF technology, a higher requirement is imposed on a computing chip.

Step S10: Calculating a third depth obtained for each different region and performing determination. If the third depth is greater than a first threshold, step S11 is performed. If the third depth is less than the first threshold and greater than a second threshold, step S12 is performed. If the third depth is less than the second threshold, a current state is not changed.

In this step, different measurement modes are correspondingly used for targets at different distances. Due to the different effective measurement ranges of the different measurement technologies, different laser light sources, receivers, and displays may be designed in practical products based on different application scenarios, to achieve optimal cooperation of detection at different distances.

Step S11: Adjusting an emission sequence of the region to a first place and modulating an emitted pulse laser into a first form to obtain a first depth based on a time difference.

In this step, an emission sequence of a farthest region is adjusted to the first order. The depth data obtained by using the structured light technology is converted to the depth data obtained by using the dTOF technology, thereby reducing a calculation amount and improving a data acquisition speed while obtaining the depth data with optimal precision.

Step S12: Modulating an emitted pulse laser into a second form to obtain a third depth based on a phase difference.

In this step, the emission sequence is not adjusted. Even through the sequence is adjusted in step S11, first emission of the farthest region is still ensured. However, the iTOF technology and the structured light technology have no special requirement on the emission sequence of the corresponding region. A laser emission duration in the second form is less than a laser emission duration in the third form.

In this embodiment, the initial emission mode is set to the structured light mode, so that the regions can be defined very accurately, and all of the regions can achieve an optimal shape during second emission, thereby quickly achieving precise measurement of the target region and improving efficiency.

Figure 20:
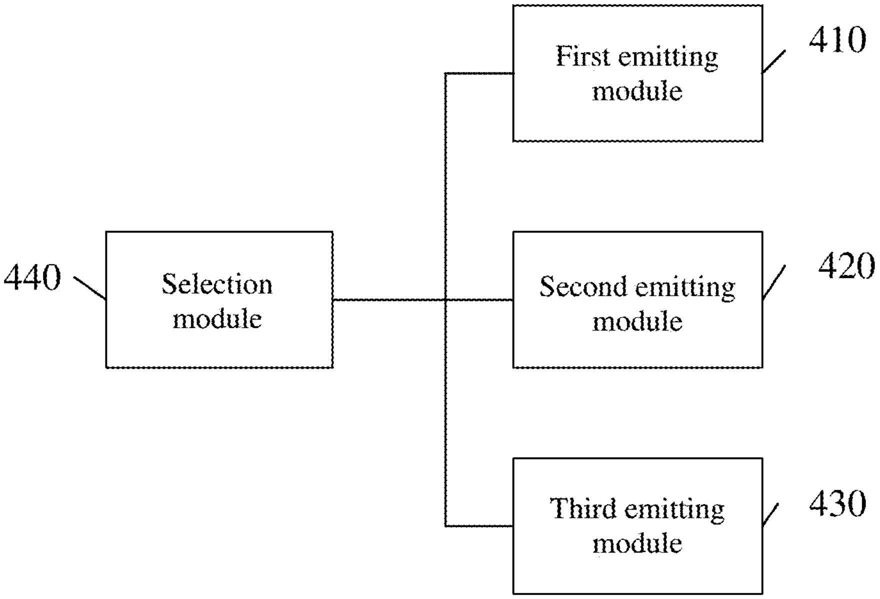
FIG. 20 is a schematic structural diagram of a laser system switching system, according to an embodiment of this application.

FIG. 20 is a schematic structural diagram of a laser switching system, according to an embodiment of this application. As shown in FIG. 20, the laser system switching system in this embodiment of this application includes:

a first emitting module 410, configured to: control a laser light source to emit pulse lasers in a first form region by region, control a receiver to receive reflected signals region by region, and obtain a first depth based on a time difference, where the regions of the laser light source and the regions of the receiver are in a one-to-one correspondence;

a second emitting module 420, configured to: control the laser light source to emit pulse lasers in a second form region by region, control the receiver to receive reflected signals region by region, and obtain a second depth based on a phase difference;

a third emitting module 430, configured to: control the laser light source to emit pulse lasers in a third form region by region, control the receiver to receive reflected signals region by region, display a preset pattern on a display corresponding to the region, and obtain a third depth based on a parallax; and a selection module 440, configured to perform determination based on the depth data obtained for each different region. If the depth data greater than a first threshold, the first emitting module performs emission. If the depth data is less than the first threshold and greater than a second threshold, the second emitting module performs emission. If the depth data is less than the second threshold, the third emitting module performs emission.

During initial emission, any of the first emitting module 410, the second emitting module 420, or the third emitting module 430 is used to control all regions of the laser light source to obtain data. Then, the selection module 440 classifies the different regions based on data obtained for the first time. A farthest region is controlled by the first emitting module 410, a region at a moderate distance is controlled by the second emitting module 420, and a closest region is controlled by the third emitting module 430, thereby achieving detection with an optimal technology at various distances and obtaining optimal accuracy. During the emission, the selection module 440 dynamically performs determination on and controls each region to enable timely perception and obtaining of changes within a target region.

In this embodiment, the different modules are used to control the three modes separately, which achieves more consistent cooperation between the laser light source and the receiver and ensures data consistency. In addition, in this embodiment, the selection module is used to determine various depth data and monitor data in each region in real time, to adapt to changes in the target region better.

A person skilled in the art may understand that each aspect of this application may be implemented as a system, a method, or a program product. Therefore, each aspect of this application may be implemented in the following forms: a hardware only implementation, a software only implementation (including firmware, microcode, and the like), or an implementation of a combination of software and hardware, which may be collectively referred to as a "circuit", a "module", or a "platform" herein.

Figure 21:
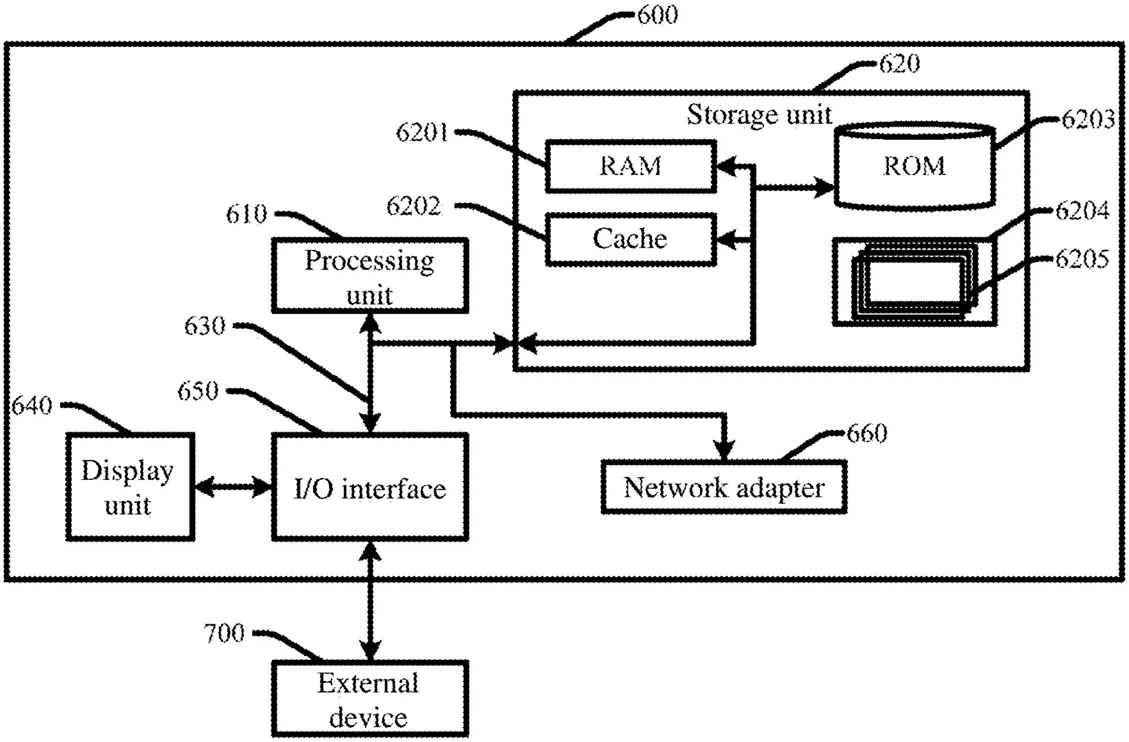
FIG. 21 is a schematic structural diagram of a laser system switching device, according to an embodiment of this application.

FIG. 21 is a schematic structural diagram of a laser system switching device, according to an embodiment of this application. An electronic device 600 in this implementation of this application is described below with reference to FIG. 21. The electronic device 600 shown in FIG. 21 is merely an example, and should not impose any limitation on a function and use scope of this embodiment of this application.

As shown in FIG. 21, the electronic device 600 is represented in a form of a general computing device. The electronic device 600 includes but is not limited to the following components: at least one processing unit 610, at least one storage unit 620, a bus 630 that connects different platform components (including the storage unit 620 and the processing unit 610), a display unit 640, and the like.

The storage unit stores a program code, and the program code may be executed by the processing unit 610, so that the processing unit 610 performs the steps according to the various exemplary implementations of this application described in the foregoing part of the laser system switching method of the specification. For example, the processing unit 610 can perform steps shown in FIGS. 17-19.

The storage unit 620 may include a readable medium in a form of a volatile storage unit, such as a random access memory (RAM) unit 6201 and/or a cache unit 6202, and may further include a read-only memory (ROM) unit 6203.

The storage unit 620 may further include a program/utility tool 6204 having a set of (at least one) program modules 6205. The program modules 6205 include, but are not limited to: an operating system, one or more applications, other program modules, and program data. Each or a combination of these examples may include implementation of a network environment.

The bus 630 may be one or more of a plurality of types of bus structures, including a storage unit bus or a storage unit controller, a peripheral bus, a graphics acceleration port, a processing unit, or a local bus that uses any of a variety of bus structures.

The electronic device 600 can further communicate with one or more external devices 700 (such as a keyboard, a pointing device, and a Bluetooth device), and can further communicate with one or more devices that enable a user to interact with the electronic device 600, and/or any device (such as a router or a modem) that enables the electronic device 600 to communicate with one or more other computing devices. Such communication may be performed by using an input/output (I/O) interface 650. In addition, the electronic device 600 can further communicate with one or more networks (such as a local area network (LAN), a wide area network (WAN), and/or a public network, for example, the Internet) by using a network adapter 660. The network adapter 660 can communicate with another module of the electronic device 600 by using the bus 630. It should be understood that, although not shown in FIG. 21, another hardware and/or software module may be used in combination with the electronic device 600, including but not limited to microcode, a device drive, a redundant processing unit, an external disk drive array, a RAID system, a tape drive, and a data backup storage platform.

An embodiment of this application further provides a computer-readable storage medium configured to store a program. When the program is executed, the steps of the laser system switching method are implemented. In some possible embodiments, each aspect of this application may be further implemented in a form of a program product including a program code. When the program product is run on a terminal device, the program code is used to enable the terminal device to perform the steps according to the various exemplary implementations of this application described in the foregoing part of the laser system switching method of the specification.

As shown above, in this embodiment, a multi-level calibration board image is used to provide appropriate positioning information for different moving objects. Through identification of smallest-level positioning information from the multi-level calibration board image obtained by a camera, a maximum amount of positioning information is obtained, thus achieving adaptive positioning for the different moving objects and achieving higher precision.

Figure 22:
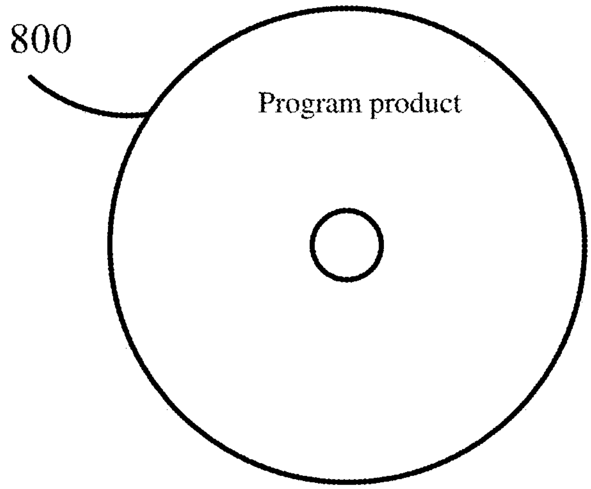
FIG. 22 is a schematic structural diagram of a computer-readable storage medium, according to an embodiment of this application.

FIG. 22 is a schematic structural diagram of a computer-readable storage medium, according to an embodiment of this application. Referring to FIG. 22, a program product 800 for implementing the foregoing methods according to an embodiment of this application is described. The program product may use a portable compact disk read-only memory (CD-ROM), includes program code, and may be run on a terminal device, for example, on a personal computer. However, the program product in this application is not limited thereto. In this specification, the readable storage medium may be any tangible medium including or storing a program, and the program may be used by or used in combination with an instruction execution system, apparatus, or device.

The program product may be any combination of one or more computer readable mediums. The computer readable medium may be a computer readable signal medium or a computer readable storage medium. The computer readable storage medium may be, for example but is not limited to, electrical, magnetic, optical, electromagnetic, infrared, or semiconductor systems, apparatuses, or devices, or any combination thereof. More specific examples (a non-exhaustive list) of the computer-readable storage medium include: an electrical connection by one or more wires, a portable disk, a hard disk, a random access memory (RAM), a read-only memory (ROM), an erasable programmable read-only memory (EPROM or a flash memory), an optical fiber, a portable compact disk read-only memory (CD-ROM), an optical memory device, a magnetic storage device, or any appropriate combination thereof.

The computer readable storage medium may be a data signal included in a baseband or transmitted as a part of a carrier, in which a readable program code is carried. The propagated data signal may have various forms, including but not limited to an electromagnetic signal, an optical signal, or any suitable combination thereof. The readable storage medium may alternatively be any readable medium other than a readable storage medium, and the readable storage medium may be used to send, propagate, or transmit a program used by or in combination with an instruction execution system, apparatus, or device. The program code included in the readable storage medium may be transmitted using any suitable medium, including but not limited to a wireless medium, a wired medium, an optical cable, RF, or any suitable combination thereof.

A program code for performing the operations of this application may be written by using any combination of one or more programming languages. The programming language includes an object-oriented programming language such as Java and C++, and further includes a conventional procedural programming language such as a "C" Language or a similar programming language. The program code may be fully executed on a computing device of a user or partially executed on a user equipment, or may be executed as an independent software package, or may be partially executed on a computing device of a user and partially executed on a remote computing device, or may be fully executed on a remote computing device or a server. In case of the remote computing device, the remote computing device may be connected to the computing device of a user by using any network, including a local area network (LAN) or a wide area network (WAN), or may be connected to an external computing device (for example, connected to the external computing device through the Internet using an Internet service provider).

In this embodiment, a multi-level calibration board image is used to provide appropriate positioning information for different moving objects. Through identification of smallest-level positioning information from the multi-level calibration board image obtained by a camera, a maximum amount of positioning information is obtained, thus achieving adaptive positioning for the different moving objects and achieving higher precision.

The embodiments in this specification are described in a progressive manner. Description of each of the embodiments focuses on differences from another embodiment, and reference may be made to each other for the same or similar parts of the embodiments. The foregoing descriptions of the disclosed embodiments enable a person skilled in the art to implement or use this application. It is apparent to a person skilled in the art to make various changes to these embodiments. The general concept defined herein may be implemented in another embodiment without departing from the spirit and scope of this application. Therefore, this application is not limited to these embodiments illustrated herein, but conforms to the broadest scope consistent with the principles and novel features disclosed in this application.

The specific embodiments of this application have been described above. It should be understood that this application is not limited to the specific foregoing embodiments. A person skilled in the art may make various variations or modifications within the scope of the claims, which does not affect the essential content of this application.

What is claimed is:

1. A lidar light source, comprising an array of edge-emitting lasers (EELs) and a cylindrical lens, wherein each of the EELs includes an active region; light emitting ports of the active regions are disposed adjacent to each other; the active regions share a cathode and include separate anodes, or share an anode and include separate cathodes; and the cylindrical lens is configured to collimate light beams emitted from the array of EELs in a fast axis direction, and fuse the light beams into a uniform light beam on a target surface.

2. The lidar light source according to claim 1, wherein a light-emitting surface of each of the EELs is located on a focal point of the cylindrical lens.

3. The lidar light source according to claim 1, further comprising a controller, wherein the controller is configured to control the active regions to be in an on or off state through an addressable drive mechanism.

4. The lidar light source according to claim 3, wherein the active regions are turned on successively, and only one of the active regions is turned on at a time.

5. The lidar light source according to claim 3, wherein all of the active regions are turned on within an emission cycle.

6. The lidar light source according to claim 1, wherein a distance between the array of EELs and the cylindrical lens is in a range of 0.1 mm to 1 mm.

7. The lidar light source according to claim 1, wherein each of the light beams collimated by the cylindrical lens is rectangular.

8. The lidar light source according to claim 1, wherein the cylindrical lens comprises a reflecting surface for changing a direction of the light beams.

9. A lidar light source, comprising an array of edge-emitting lasers (EELs) and a cylindrical lens, wherein each of the EELs includes an active region; light emitting ports of the active regions are disposed adjacent to each other; the active regions share a cathode and include separate anodes, or share an anode and include separate cathodes;

the cylindrical lens is configured to collimate light beams emitted from the array of EELS in a fast axis direction; and regions on the cylindrical lens projected by the light beams emitted from the array of EELs do not overlap.

10. The lidar light source according to claim 9, wherein a light-emitting surface of each of the EELs is located on a focal point of the cylindrical lens.

11. The lidar light source according to claim 9, wherein an opaque pattern is arranged at each of the regions on the cylindrical lens, and the opaque patterns are different from each other.

12. The lidar light source according to claim 9, wherein the cylindrical lens comprises a reflecting surface for changing directions of the light beams.

13. The lidar light source according to claim 9, wherein the array of EELs are arranged in at least two rows.

14. The lidar light source according to claim 9, wherein surfaces of the active regions are in an arc shape.

15. A lidar light source, comprising an array of edge-emitting lasers (EELs), a cylindrical lens, and a display, wherein each of the EELs includes an active region; light emitting ports of the active regions are disposed adjacent to each other; the active regions share a cathode and include separate anodes, or share an anode and include separate cathodes;

the cylindrical lens is configured to collimate light beams emitted from the array of EELs in a fast axis direction;

the light beams emitted from the array of EELs are modulated into specific shapes and emitted in a form of pulses; and the display is configured to display patterns to shape the light beams, wherein the patterns do not allow the light beams to pass through.

16. The lidar light source according to claim 15, wherein the display comprises a plurality of sub-screens, a number of the sub-screens is equal to a number of the active regions, and a light beam emitted from each of the active regions is emitted through a corresponding sub-screen.

17. The lidar light source according to claim 15, further comprising a controller, wherein the controller is configured to control the active regions to be in an on or off state through an addressable drive mechanism.

18. The lidar light source according to claim 15, wherein the display is configured to dynamically adjust the displayed patterns.

19. A lidar system, comprising the lidar light source according to claim 1 and a receiving sensor, wherein the receiving sensor is synchronized with the lidar light source to receive a reflected signal of a laser for three-dimensional reconstruction.

20. The lidar system according to claim 19, wherein the receiving sensor is divided into n sub-regions, and n equals to a number of the active regions; the sub-regions are in a one-to-one correspondence with the active regions; and a sub-region is controlled to operate when a corresponding active region operates.

* * * * *